(12) United States Patent
Kawai et al.

(10) Patent No.: US 6,449,060 B1
(45) Date of Patent: Sep. 10, 2002

(54) IMAGE PROCESSING APPARATUS AND METHOD

(75) Inventors: Takashi Kawai, Yokohama; Takeshi Aoyagi, Tokyo; Akihiro Matsuya, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/898,255

(22) Filed: Jul. 22, 1997

(30) Foreign Application Priority Data

Jul. 22, 1996 (JP) .............................. 8-192577
Jul. 22, 1996 (JP) .............................. 8-192578
Jul. 22, 1996 (JP) .............................. 8-192582

(51) Int. Cl.$^7$ .......................... G06K 15/02; H04N 1/40; H04N 1/46
(52) U.S. Cl. .......................... 358/1.9; 358/530; 382/162
(58) Field of Search .......................... 358/1.9, 504, 500, 358/515, 530; 382/162

(56) References Cited

U.S. PATENT DOCUMENTS

| 5,339,365 A | 8/1994 | Kawai et al. |
| 5,422,739 A | 6/1995 | Usami et al. ................ 358/518 |
| 5,504,592 A | 4/1996 | Usami et al. ................ 358/518 |

FOREIGN PATENT DOCUMENTS

JP 4-282968 * 10/1962 ............ H04N/1/46

* cited by examiner

Primary Examiner—Scott Rogers
(74) Attorney, Agent, or Firm—Fitzpatrick, Cella, Harper & Scinto

(57) ABSTRACT

This invention provides an image processing apparatus which simplifies the circuit arrangement required for edge emphasis correction. For this purpose, the apparatus has a first color conversion unit (102) for color-separating input image data into lightness data and chromaticity data, a delay unit (103) for delaying the separated lightness data by N lines, and delaying the chromaticity data by N/2 lines, an image edge amount extraction unit (113) for extracting an image edge portion from the lightness data, a saturation amount extraction unit (114) for extracting the saturation component from the chromaticity data, and an image edge emphasis amount distribution unit (116) for distributing the emphasis amount of the edge portion to an edge emphasis unit (104) so that the distribution ratio for chromaticity correction is higher than that for lightness correction when the saturation component extracted by the saturation extraction unit (114) is large, and the distribution ratio for lightness correction is higher than that for chromaticity correction when the saturation component extracted by the saturation extraction unit (114) is small.

2 Claims, 35 Drawing Sheets

| -10 | -23 | -22 | -23 | -10 |
|---|---|---|---|---|
| -23 | 10 | 54 | 10 | -23 |
| -22 | 54 | 56 | 54 | -22 |
| -23 | 10 | 54 | 10 | -23 |
| -10 | -23 | -22 | -23 | -10 |

∗1/128

CHARACTER SPATIAL
FILTER COEFFICIENT

202

| -4 | -10 | -9 | -10 | -4 |
|---|---|---|---|---|
| -10 | 8 | 34 | 8 | -10 |
| -9 | 34 | -36 | 34 | -9 |
| -10 | 8 | 34 | 8 | -10 |
| -4 | -10 | -9 | -10 | -4 |

∗1/128

HARFTONE IMAGE SPATIAL
FILTER COEFFICIENT

FIG.10
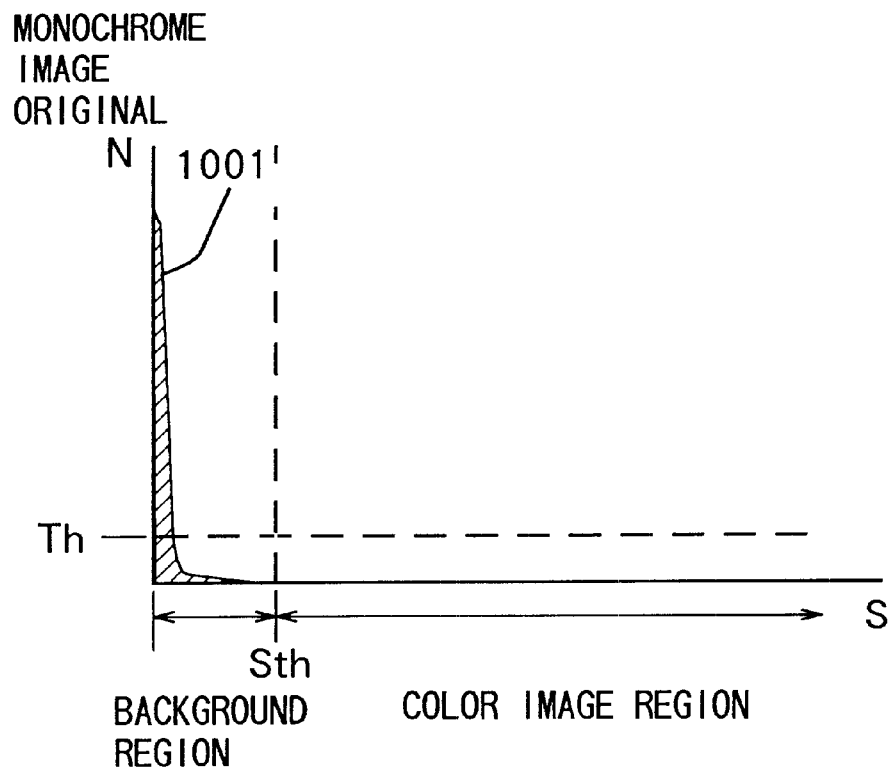
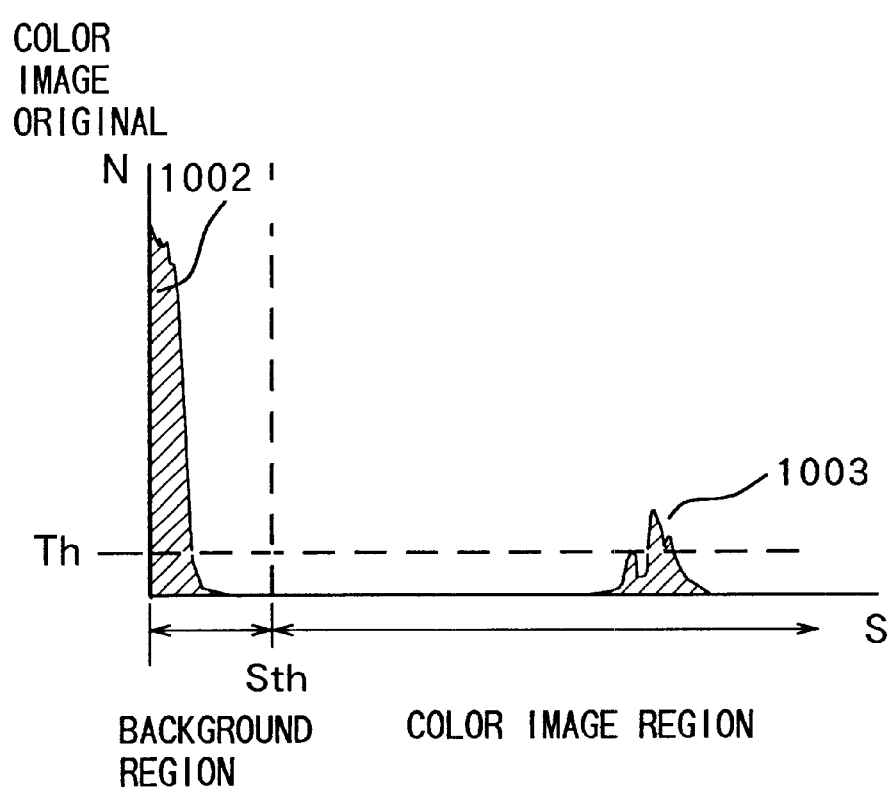

| -10 | -23 | -22 | -23 | -10 |
|---|---|---|---|---|
| -23 | 10 | 54 | 10 | -23 |
| -22 | 54 | 184 | 54 | -22 |
| -23 | 10 | 54 | 10 | -23 |
| -10 | -23 | -22 | -23 | -10 |

∗1/128

CHARACTER SPATIAL
FILTER COEFFICIENT

1302

| -4 | -10 | -9 | -10 | -4 |
|---|---|---|---|---|
| -10 | 8 | 34 | 8 | -10 |
| -9 | 34 | 92 | 34 | -9 |
| -10 | 8 | 34 | 8 | -10 |
| -4 | -10 | -9 | -10 | -4 |

∗1/128

HARFTONE IMAGE SPATIAL
FILTER COEFFICIENT

FIG.29

| 1 | 1 | 1 |
|---|---|---|
| 1 | 1 | 1 |
| 1 | 1 | 1 |

$* (1/9)$

WEIGHTED MEAN COEFFICIENT FOR SMOOTHING

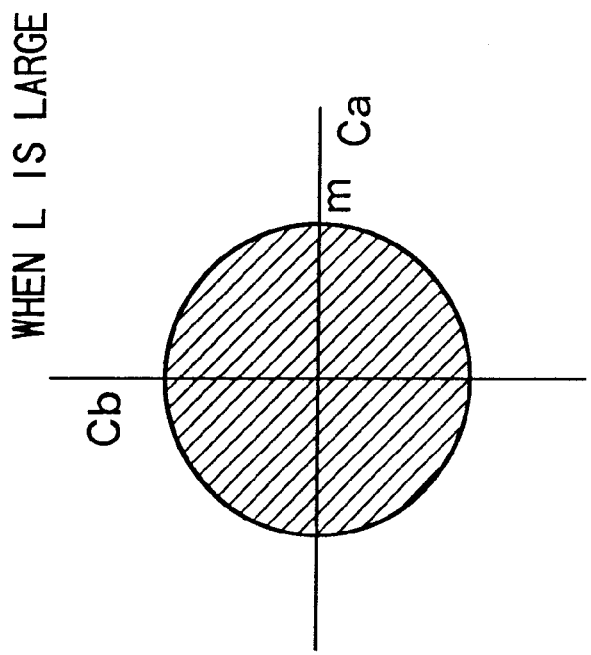
FIG.33B WHEN L IS LARGE
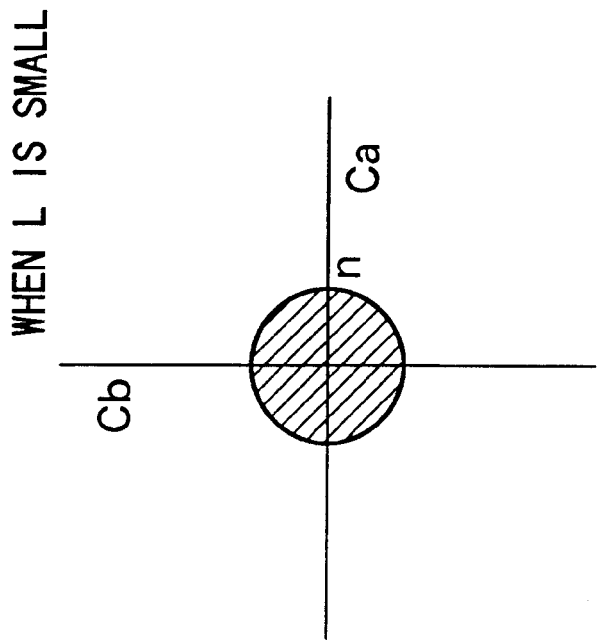
FIG.33A WHEN L IS SMALL

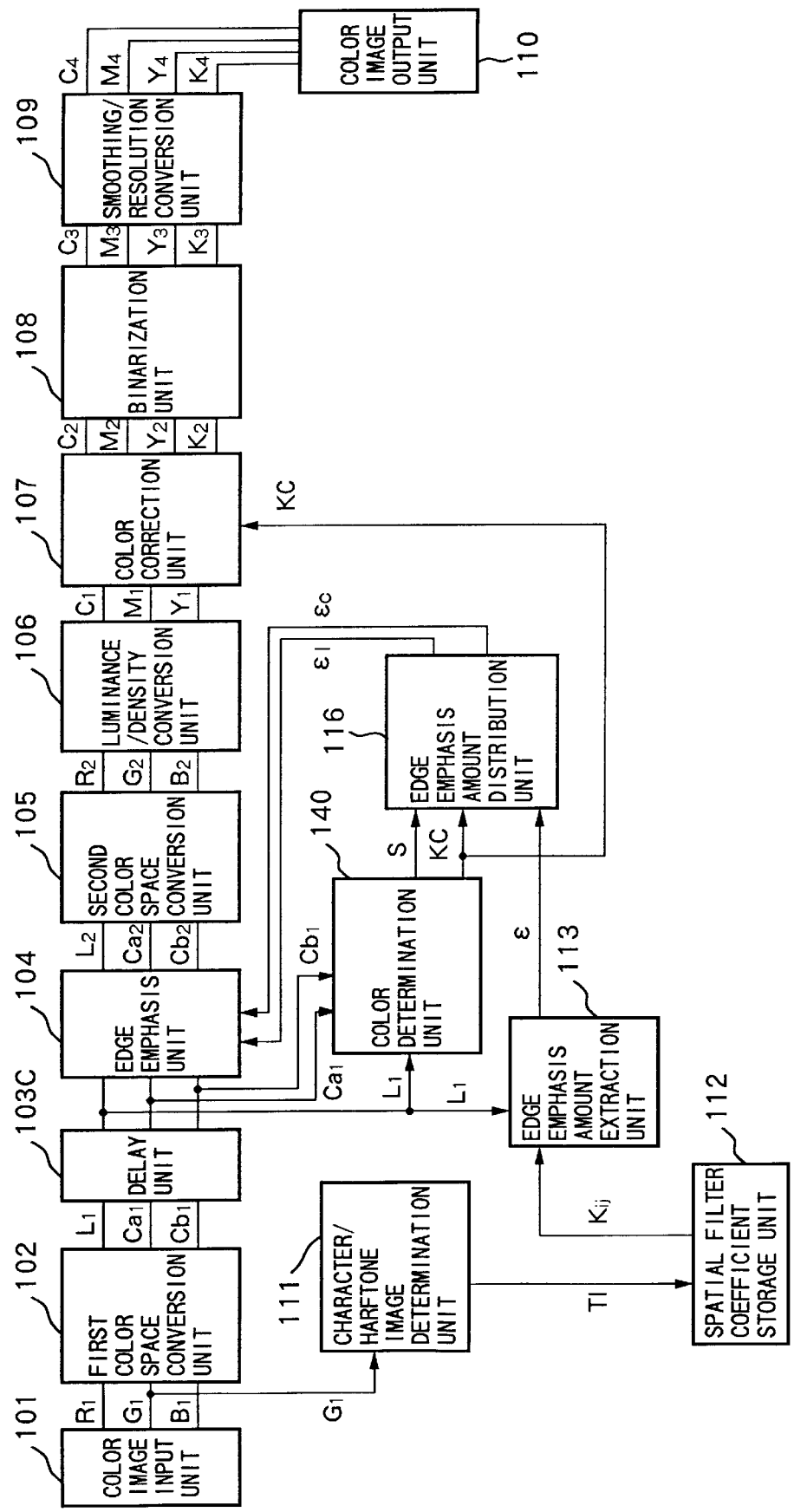

IMAGE PROCESSING APPARATUS AND METHOD

BACKGROUND OF THE INVENTION

The present invention relates to an image processing apparatus and method and, more particularly, to an image processing apparatus and method for performing color processing of an input image signal.

An example of a conventional color image processing apparatus will be described below with reference to FIG. 12 taking color image processing in a color copying machine as an example. In FIG. 12, reference numeral 101 denotes a color image input unit such as an image reader unit of a color copying machine. The color image input unit outputs three color-separated signals R1, G1, and B1 which are obtained by color-separating each pixel of a color image into R, G, and B components. The three color-separated signals R1, G1, and B1 are input to an achromatic color/chromatic color determination unit 1201, which determines if the pixel of interest is a monochrome pixel (achromatic color) or a color pixel (chromatic color), and outputs a determination signal KC.

The signal G1 of the three color-separated signals is input to a character/halftone image determination unit 111, which determines if the pixel of interest corresponds to a line image such as a character or a thin line or a continuous-gradation image (halftone image) such as a picture image or a printed image, and outputs a character/halftone image determination signal TI. The character/halftone image determination signal TI is input to a spatial filter coefficient storage unit 112, which selects character spatial filter coefficients 1301 shown in FIG. 13 when the pixel of interest corresponds to a character signal, or selects halftone image spatial filter coefficients 1302 shown in FIG. 13 when the pixel of interest corresponds to a halftone image signal.

Conventional spatial filter processing such as edge emphasis and the like will be explained below. FIG. 13 shows an example of the 5×5 pixel character spatial filter coefficients 1301, and the halftone image spatial filter coefficients 1302. The character spatial filter coefficients 1301 are determined to effect stronger edge emphasis than the coefficients 1302 for a halftone image.

The character or halftone image spatial filter coefficients Kij selected in accordance with the character/halftone image determination signal TI are set in edge emphasis units 103-R, 103-G, and 103-B to respectively edge-emphasize the three color-separated signals R1, G1, and B1, thus outputting signals R2, G2, and B2.

FIG. 14 shows an example of the edge emphasis unit 103-R. A dotted frame 1401 represents a data delay circuit in the edge emphasis unit 103-R. The signal R input to the edge emphasis unit 103-R is input to line memories 801, 802, 803, and 804 that store image data for four lines. Image data for a total of five lines, i.e., the stored image data for four lines and image data of the line of interest, are input to flip-flops in units of lines to extract five successive pixel data (Xj1 to Xj5).

The signals R for 5 lines×5 pixels, i.e., a total of 25 signals R (Xij: $1 \leq i \leq 5$) are multiplied by spatial filter coefficients (aij: $1 \leq i \leq 5, 1 \leq j \leq 5$) indicated by a dotted frame 1403 and corresponding to pixel positions by an edge emphasis arithmetic circuit indicated by a dotted frame 1402, and the products are added to each other. These spatial filter coefficients are supplied from the spatial filter storage unit.

Such calculations require 25 multipliers (1404 to 1428) for 25 pixels, and 24 adders (1429 to 1452) of the products.

The conventional spatial filter processing for the signal R has been described. The same applies to signals G and B. Consequently, the processing circuit for all the signals R, G, and B requires a circuit scale: line memories for 12 lines (4 lines×3 colors), 75 multipliers (25×3 colors), and 72 adders (24×3 colors).

The three edge-emphasized color-separated signals R2, G2, and B2 shown in FIG. 12 are input to a luminance/density conversion unit 106, and are converted into density signals C1, M1, and Y1 by, e.g., log conversion. The density signals C1, M1, and Y1 are input to a color correction unit 107 to be subjected to color processing such as generation of a black signal K, undercolor removal (UCR), color correction, and the like, thus outputting density signals C2, M2, Y2, and K2.

The color correction unit 107 sets the density signals C2, M2, and Y2 at C2=M2=Y2=0 in accordance with the determination signal KC as the determination result of the achromatic color/chromatic color determination unit 1201 when the pixel of interest is an achromatic pixel, thereby converting the pixel of interest into a pixel defined by black color alone. Reference numeral 110 denotes a color image output unit which comprises an image recording apparatus such as an electrophotographic or ink-jet printer.

When the color image output unit is, e.g., a binary printer, the density signals C2, M2, Y2, and K2 are converted into binary pixel signals C3, M3, Y3, and K3 by a binarization unit 108.

On the other hand, when the resolution of the image input from the color image input unit 101 is different from that of the image to be output from the color image output unit 110, the binary pixel signals C3, M3, Y3, and K3 are subjected to resolution conversion processing by a smoothing/resolution conversion unit 109 to be converted into signals C4, M4, Y4, and K4. Especially, when the resolution of the color image output unit 110 is higher than that of the color image input unit 101, smoothing processing for smoothly interpolating edge portions of the image is performed, and the processing result is printed by the color image output unit 110.

However, as described above, the conventional image edge emphasis requires identical arrangements in units of signals to process the signals R (103-R), G (103-G), and B (103-B). Especially, in order to perform two-dimensional plane spatial filtering processing of the above-mentioned 5×5 pixel size for an image signal from the image reader unit of the color copying machine using a CCD line image sensor as the image input unit, many line memories, multipliers, and adders are required, as described above, resulting in high cost.

In terms of image quality, since the above-mentioned color correction unit 107 sets the density signals C2, M2, and Y2 to be C2=M2=Y2=0 in accordance with the determination result of the achromatic color/chromatic color determination unit 1201 when the pixel of interest is an achromatic pixel, so as to convert the pixel of interest into a pixel defined by black color alone, the densities obtained by the signals C2, M2, and Y2 are lost, resulting in a low density.

In general, in a color image processing apparatus, especially, in a color copying machine, when an image corresponding to a monochrome original is to be formed and output, the image is copied using four colors, i.e., C (cyan), M (magenta), Y (yellow), and K (black). However, in the case of a laser beam printer, in consideration of the service life of a drum and consumption of toner, the image corresponding to the monochrome original is preferably copied using black color alone. The same applies to a copying machine that incorporates an ink-jet printer.

For this reason, the copying machine is required to have a processing unit for determining if the input original is a color or monochrome original. Conventionally, such processing is realized by simple evaluation, i.e., by summing up the color pixels of an input original and performing simple statistical processing of the sum or comparing the sum with a threshold value or a slice level.

However, when color pixel determination is done based on color components (in this case, R, G, and B luminance values) in units of pixels in an original input device, if the reading elements for the individual color components cannot read perfectly the same pixel positions in an original, i.e., they are shifted by a small distance, a so-called pixel shift phenomenon occurs, and this finally results in "color misregistration". In particular, since recent image scanners tend to have higher reading precision (resolution), the above-mentioned problem is inevitable.

As can be understood from the above reason, when an image scanner reads a uniform original (e.g., white paper), color misregistration does not show even if the reading position of the image scanner has shifted.

The problem is noted in the vicinity of the edge in, e.g., a black character or line image (to be referred to as a black character hereinafter). If color misregistration has occurred at the edge of a black character due to pixel shift, the pixel at that position is determined to be a chromatic pixel. Hence, the above-mentioned simple statistical processing or comparison between the number of pixels and the slice level may determine a color original if the original includes many characters.

As a consequence, an image that must be copied using black color alone is copied using C, M, Y, and K.

On the other hand, a specific color is likely to be determined as an achromatic color, especially, in the case it has a high density.

Furthermore, even when an achromatic color is read by a scanner, color misregistration is caused by mechanical vibrations, chromatic aberrations of lenses, different MTF, and the like, and the read achromatic color may be erroneously determined as a chromatic color.

Since these determination errors associated with achromatic/chromatic colors have adverse influences on the subsequent processing in the color correction unit and edge emphasis units, the quality of the image to be finally formed deteriorates.

SUMMARY OF THE INVENTION

The present invention has been made in consideration of the above situation, and has as its first object to provide a color image processing apparatus which can perform correction of spatial frequency characteristics such as edge emphasis while suppressing deterioration of image quality, and can reduce cost associated with correction and, as its second object to provide an image processing apparatus which can convert an achromatic color signal into single black color with a proper image density.

It is still another object of the present invention to provide an image processing apparatus and method, which can accurately discriminate if an input image is a color or monochrome image, even when color misregistration has occurred during input of the image.

It is still another object of the present invention to provide an image processing apparatus and method, which can determine an achromatic color/chromatic color of each pixel with high precision in input color image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 shows examples of spatial filter coefficients used in the embodiment of the present invention;

FIG. 10 shows the histograms of a saturation signal to explain original image color determination processing in the second embodiment of the present invention;

FIG. 13 shows spatial filter coefficients in the conventional image processing apparatus;

FIG. 29 shows weighted mean coefficients for smoothing in the color determination unit 120;

FIGS. 33A and 33B show the effective ranges of slice levels based on the lightness range in the eighth embodiment;

FIG. 34 is a block diagram showing the arrangement of an apparatus according to the ninth embodiment of the present invention;

DETAILED DESCRIPTION OF THE PREFERRED EMBODIMENTS

The preferred embodiments of the present invention will be described in detail hereinafter with reference to the accompanying drawings.

Figure 15:
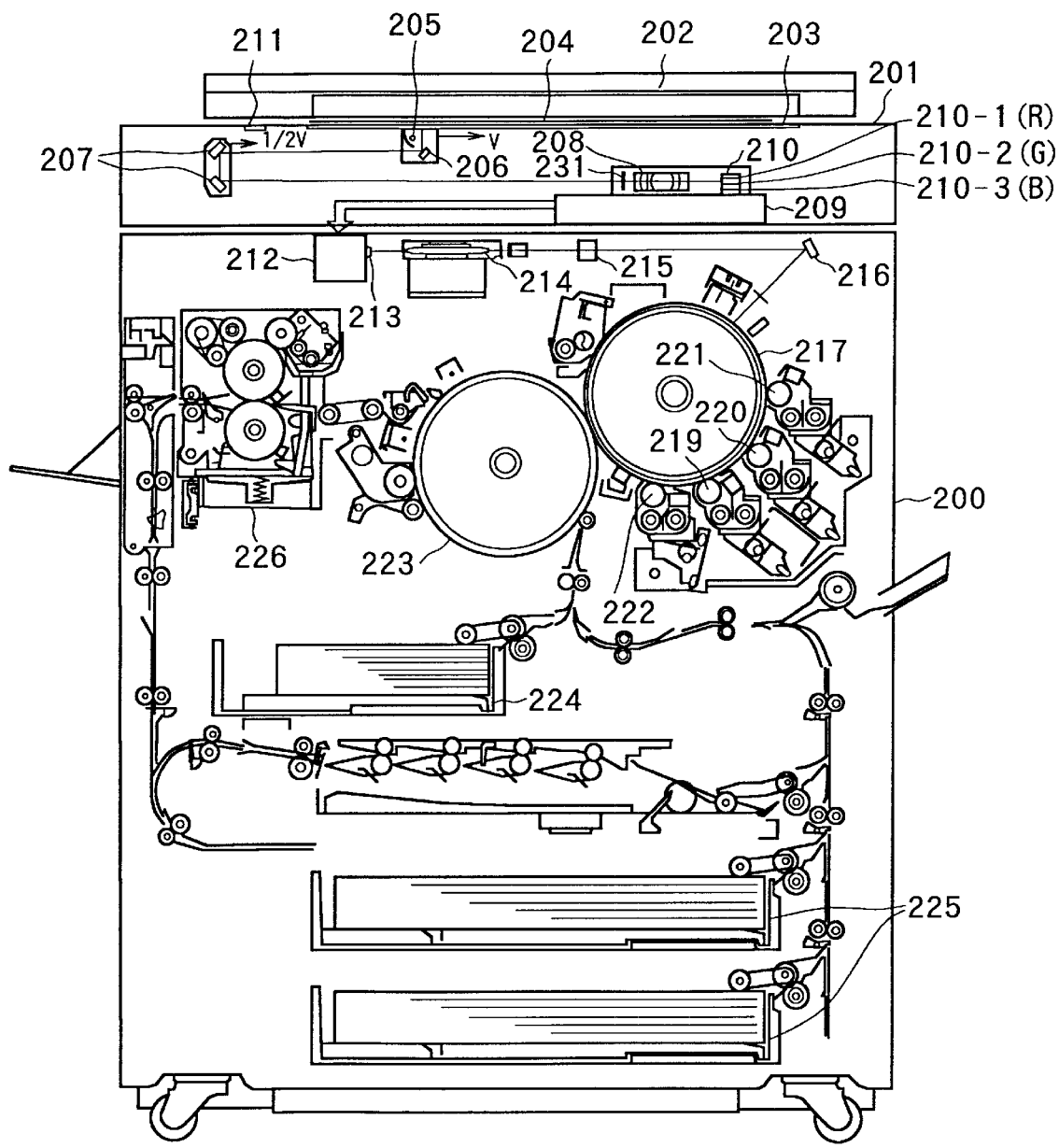
FIG. 15 is a sectional view showing the structure of a copying machine common to the individual embodiments.

FIG. 15 is a sectional view showing the structure of a color copying machine common to the following embodiments. In FIG. 15, reference numeral 201 denotes an image scanner unit which reads an original image, and performs digital signal processing for the read original image. Reference numeral 200 denotes a printer unit which forms an image corresponding to the original image read by the image scanner unit 201, and prints it out onto a recording sheet.

In the image scanner unit 201, reference numeral 202 denotes an original pressing plate; and 203, an original table glass (platen glass). An original 204 is placed on the original table glass with its recorded surface facing down, and its position is fixed by the original pressing plate 202. Reference numeral 205 denotes a halogen lamp which illuminates the original. Light reflected by the original 204 is guided by mirrors 206 and 207, and is imaged on the light-receiving surface of a linear CCD image sensor (to be referred to as a CCD hereinafter) 210 via a lens 208. Note that the lens 208 has an infrared cut filter.

The CCD 210 reads light coming from the original while separating it into red (R), green (G), and blue (B) colors, and sends color-separated signals to an image processing unit 209.

The CCD 210 has three lines of light-receiving pixel arrays each including about 7,500 pixels in correspondence with R, G, and B, and can read the widthwise direction (297 mm) of an A3-size original at 600 dpi (dots/inch). Similarly, in order to read the widthwise direction (297 mm) of an A3-size original at 400 dpi, R, G, and B linear image sensors each including about 5,000 pixels can be used.

When the halogen lamp 205 and the mirror 206 mechanically move at a velocity v in the sub-scanning direction (the direction perpendicular to the arrangement of the CCD 210), and the mirror 207 moves at a velocity v/2 in the sub-scanning direction, the reflected light is imaged on and read by the CCD 210 via a predetermined distance.

Reference numeral 211 denotes a reference white plate having a uniform density, which presents a reference density value used for correcting shading nonuniformity caused by the lens 208, and sensitivity nonuniformity in units of pixels of the CCD sensor.

As will be described in detail later, the image processing unit 209 converts signals read by the CCD sensor 210 into digital signals, forms magenta (M), cyan (C), yellow (Y), and black (BK) color component images corresponding to ink colors upon printing, and outputs them to the printer unit 200. One of the M, C, Y, and BK color component images is sent to the printer unit per original scan (corresponding to one sub-scan) in the image scanner unit 201. Hence, single print processing is completed by four scans, i.e., by sequentially sending image signals for four colors to the printer unit 200. If the image processing unit 209 has a sufficient memory, the reading result of a single scan may be stored in the memory, and the need for four scans may be obviated.

The M, C, Y, and BK image signals output from the image processing unit 209 are supplied to a laser driver 212 in the printer unit 200. The laser driver 212 drives a laser diode to emit light in correspondence with image signals of the individual pixels, thereby outputting a laser beam. The laser beam scans the surface of a photosensitive drum 217 via a polygonal mirror 214, an f-θ lens 215, and a mirror 216.

Reference numerals 219 to 222 denote developers which respectively perform developments using magenta, cyan, yellow, and black inks. These four developers 219 to 222 are brought into contact with the photosensitive drum 217 in turn, and develop electrostatic latent images formed on the photosensitive drum by the irradiated laser beam using the corresponding color toners.

Reference numeral 223 denotes a transfer drum, which winds on itself a recording sheet fed from a paper cassette 224 or 225 by the effect of static electricity, and transfers toner images developed on the photosensitive drum 217 onto the recording sheet. In recording using four color components, the transfer drum 223 rotates four times to superpose-record the toner images of the individual color components. Finally, the recording sheet is peeled from the transfer drum by a peeling pawl, and is fed to a fixing unit 226. The toner images formed on the recording sheet are fixed by the fixing unit 226, and thereafter, the recording sheet is discharged outside the apparatus.

The outline of the operation of the image processing apparatus of this embodiment has been described.

Note that a branch convey path is attached to a discharge port, as shown in FIG. 15, so as to record on the rear surface of the recording sheet and to attain multiple recording. When the recording sheet is fed again into the apparatus via this convey path, recording on the rear surface and multiple recording can be realized.

Figure 1:
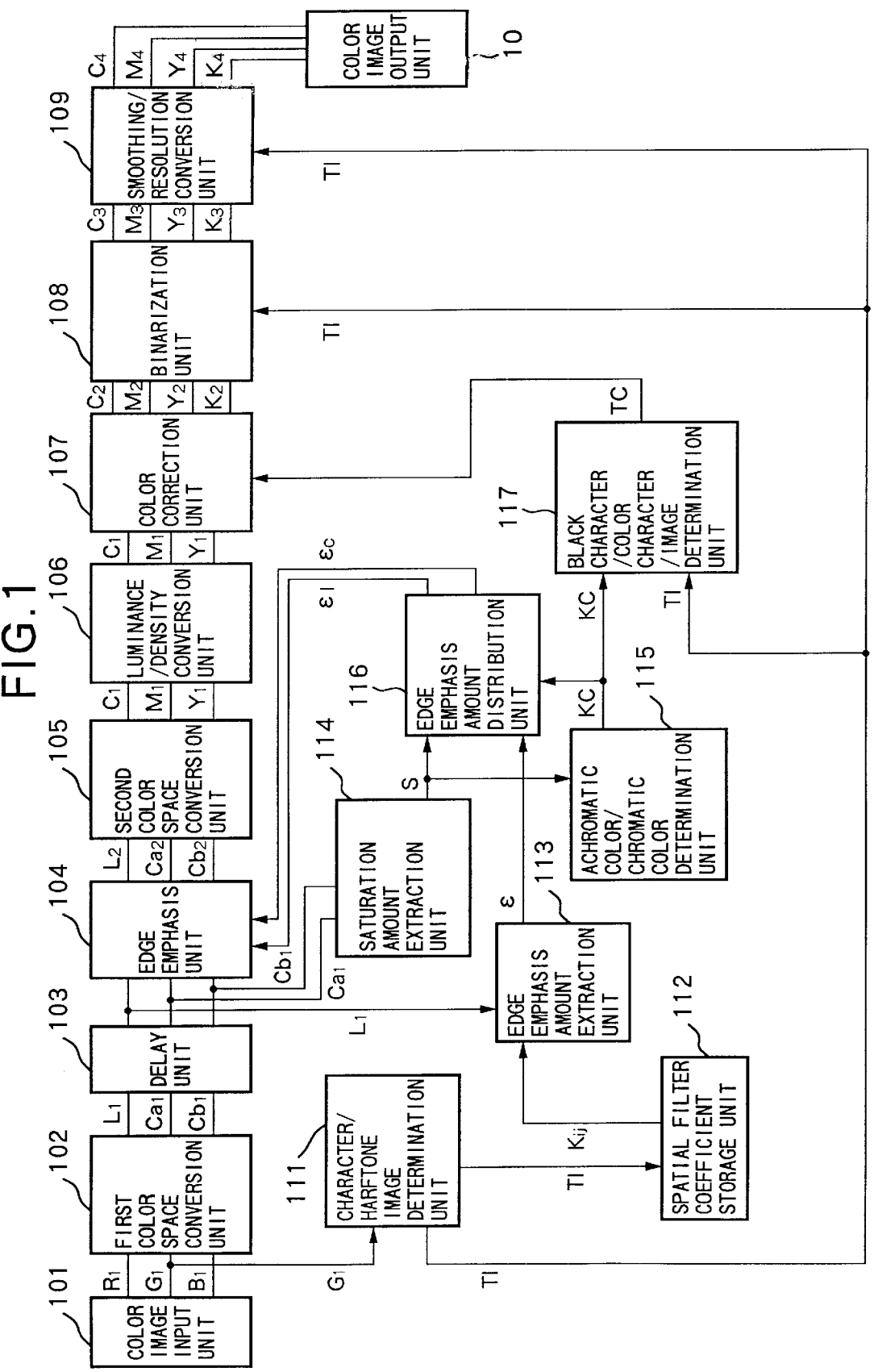
FIG. 1 is a block diagram showing the arrangement of an image processing apparatus according to an embodiment of the present invention.

FIG. 1 is a block diagram mainly showing the arrangement of the image processing unit 209. The same reference numerals in FIG. 1 denote the same parts as in FIG. 12 described above, and a detailed description thereof will be omitted.

Referring to FIG. 1, reference numeral 101 denotes a color image input unit which comprises, e.g., an image reader unit. In addition, the color image input unit may include various types of image input units of color image processing apparatuses such as an original image reading device, e.g., a color image scanner, an image input unit from a computer in a broad sense, and the like.

Figure 12:
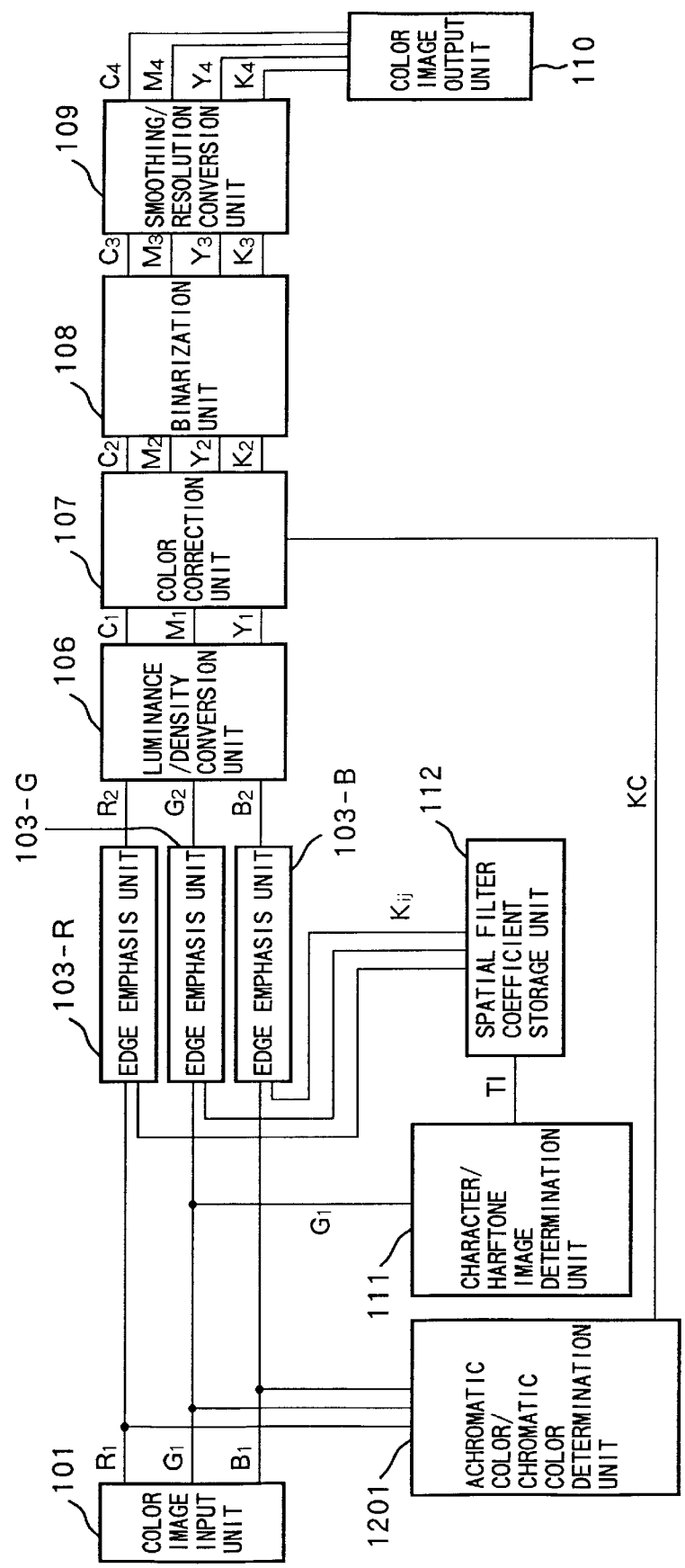
FIG. 12 is a block diagram showing the arrangement of a conventional image processing apparatus.
Figure 14:
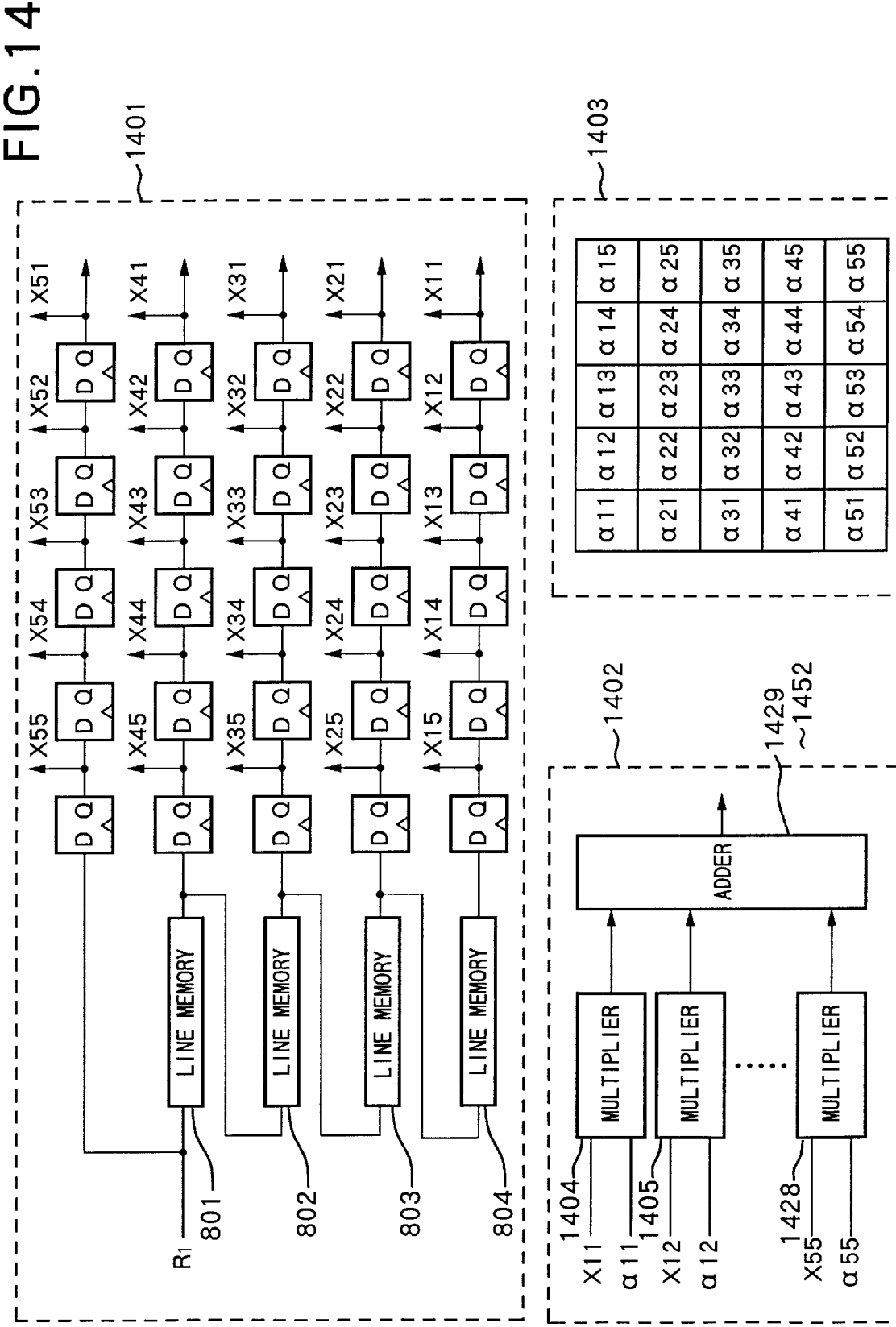
FIG. 14 is a block diagram showing a spatial filter processing circuit in the conventional image processing apparatus.

In FIG. 1, other reference numerals 106, 107, 108, 109, 110, 111, and 112 respectively denote a luminance/density conversion unit (106), a color correction unit (107), a binarization unit (108), a smoothing/resolution conversion unit (109), a color image output unit (110), a character/halftone image determination unit (111), and a spatial filter coefficient storage unit (112), which have functions described in the prior art shown in FIG. 12.

A signal G1 as one of three color-separated signals R1, G1, and B1 read by the color image input unit 101 is input to the character/halftone image determination unit 111, which determines if the pixel of interest corresponds to a line image (binary image) such as a character or thin line, or a continuous gradation image (halftone image) such as a picture image or printed image. The character/halftone image determination unit 111 outputs its determination result as a character/halftone image determination signal TI.

The character/halftone image determination signal TI is input to the spatial filter coefficient storage unit 112. The spatial filter coefficient storage unit 112 stores character spatial filter coefficients and halftone image spatial filter coefficients. When the pixel of interest corresponds to a character signal, the storage unit 112 selects the character spatial filter coefficients; when the pixel of interest corresponds to a halftone image signal, it selects the halftone image spatial filter coefficients. The storage unit 112 then outputs the selected coefficients as character or halftone image spatial filter coefficients Kij.

FIG. 2 shows examples of the spatial filter coefficients Kij stored in the spatial filter coefficient storage unit 112 in the embodiment of the present invention. In FIG. 2, reference numeral 201 denotes character spatial filter coefficients; and 202, halftone image spatial filter coefficients.

The difference between the character or halftone image spatial filter coefficients Kij in the above-mentioned prior art, and the character or halftone image spatial filter coefficients Kij in the embodiment of the present invention will be explained below. The DC component of the character or halftone image spatial filter 1301 or 1302 in the above-mentioned prior art shown in FIG. 13 is unity, while the DC component of the character or halftone image spatial filter 201 or 202 in the embodiment of the present invention is zero. That is, for an image flat portion without any edge components, an output value J after the conventional spatial filter processing directly outputs an input image signal value, while the output value after spatial filter processing in the embodiment of the present invention becomes zero.

On the other hand, the three color-separated signals R1, G1, and B1 of the color image from the color image input unit 101 are input to a first color space conversion unit 102 serving as a color separation unit, and are converted into a lightness signal L1 representing lightness and chromaticity signals (Ca1, Cb1) representing color tones. The lightness signal L1 and the chromaticity signals (Ca1, Cb1) may be either three primary colors $L^*$, $a^*$, and $b^*$ in the "CIE1976 ($L^*a^*b^*$) color space" or three primary colors $L^*$, $u^*$, and $v^*$ in the "CIE1976 ($L^*u^*v^*$) color space" colorimetrically, and the color space is not particularly limited. Furthermore, an arbitrary color space which is determined by a simpler method may be used.

Equations (1) below present an example of conversion formulas for converting three color-separated signals R, G, and B into lightness and chromaticity signals L1, Ca1, and Cb1 by a simple method.

$$L=(R+2G+B)/4$$

$$Ca=(R-G)/2$$

$$Cb=(R+G-2B)/4 \qquad (1)$$

The lightness signal L1 and chromaticity signals (Ca1, Cb1) converted by the first color space conversion unit 102 are input to a delay unit 103, which delays the lightness signal L1 by N lines and delays the chromaticity signals (Ca1, Cb1) by N/2 lines. More specifically, when filter processing of 5×5 pixels is performed, as shown in FIG. 2, lightness signals L1 for four lines and chromaticity signals (Ca1, Cb1) for two lines (half the four lines) are stored, and the stored signals are delayed by the time required until they are output from the output.

The lightness signal L1 delayed by N lines by the delay unit 103 is input to an edge emphasis amount extraction unit 113 as data for a total of five lines, i.e., data for the four delayed lines and those for the current line in practice, although not shown in FIG. 1. The edge emphasis amount extraction unit 113 extracts an edge emphasis amount $\epsilon$ using the character or halftone image spatial filter coefficients Kij selected by the character/halftone image determination signal TI.

Figure 3:
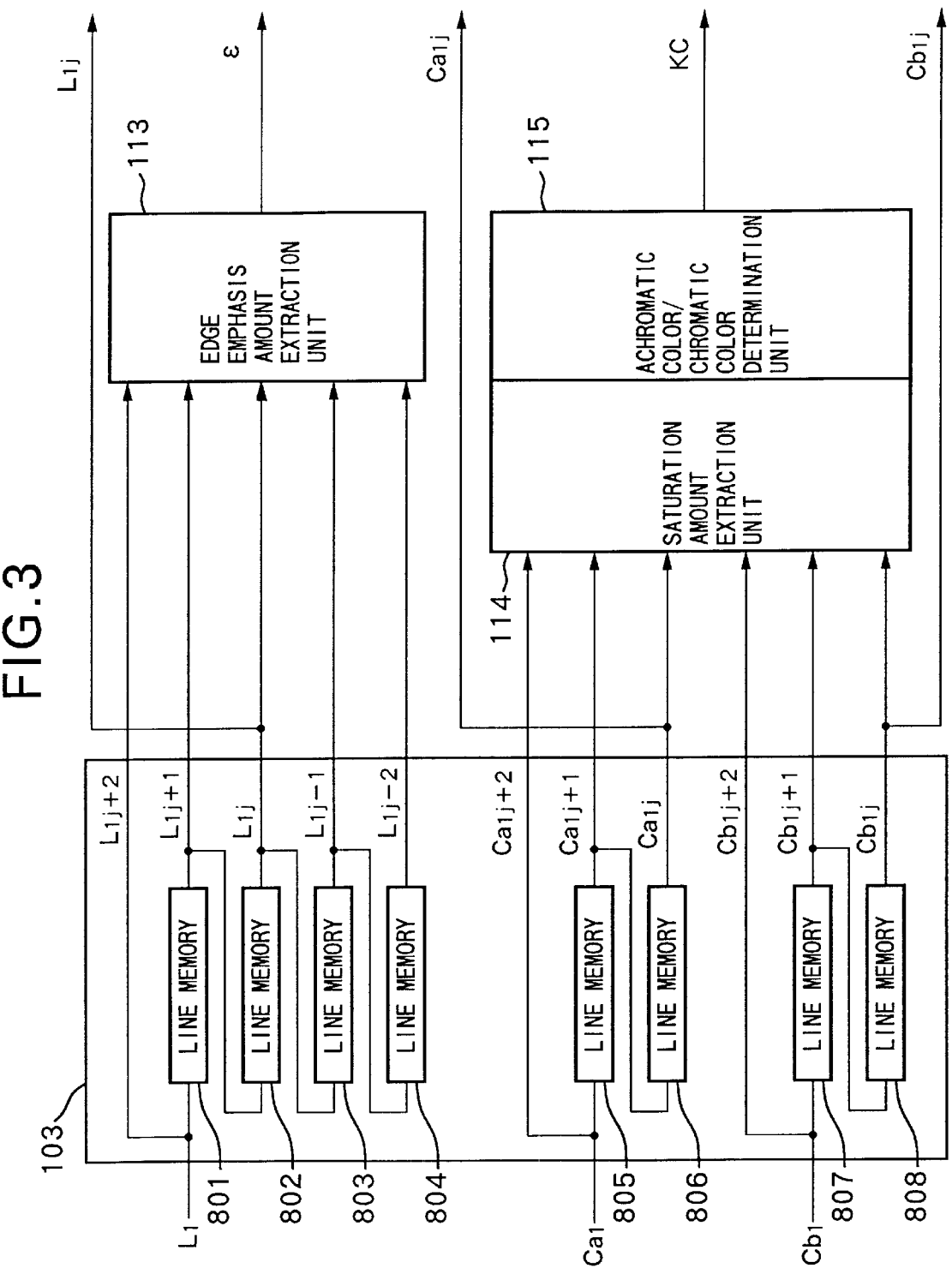
FIG. 3 is a block diagram for explaining an example of a signal delay unit in the embodiment of the present invention.

Note that this data delay processing and the subsequent image processing portion will be described in detail later with the aid of FIG. 3.

The edge emphasis amount $\epsilon$ is input to an edge emphasis amount distribution unit 116, and is distributed to an edge emphasis correction amount $\epsilon$l for the lightness signal L1 and an edge emphasis correction amount $\epsilon$c for the chromaticity signals (Ca1, Cb1) in correspondence with the magnitude of a saturation signal S (to be described below) input to the edge emphasis amount distribution unit 116 at the same time. On the other hand, the chromaticity signals (Ca1, Cb1) delayed by the delay unit 103 are input to a saturation amount extraction unit 114 as data for a total of three lines, i.e., data for the two delayed lines and those for the current line in practice, although not shown in FIG. 1, thus generating a saturation signal S that represents the vividness of a color.

A method of generating the saturation signal S from the chromaticity signals (Ca1, Cb1) in the embodiment of the present invention will be briefly described below.

If the chromaticity signals (Ca1, Cb1) are those (a*, b*) in the CIE1976 (L*a*b*) color space or those (u*, v*) in the CIE1976 (L*u*v*) color space described above, the saturation signal S is given by the following equation (2):

$$S=(Ca1^2+Cb1^2)^{0.5} \quad (2)$$

More simply, the saturation signal S may be written:

$$S=\text{MAX}(Ca1, Cb1) \quad (3)$$

where the function MAX(A, B) outputs a larger one of variables A and B.

The edge emphasis amount distribution unit 116 also receives a determination signal KC from an achromatic color/chromatic color determination unit 115 in addition to the edge emphasis amount ϵ and the saturation signal S. The achromatic color/chromatic color determination unit 115 determines if the pixel of interest is a monochrome pixel (achromatic color) or a color pixel (chromatic color) as in the achromatic color/chromatic color determination unit 1201 described above with reference to FIG. 12, and outputs the determination signal KC. In the embodiment of the present invention, the achromatic color/chromatic color determination unit 115 receives the saturation signal S that represents the vividness of a color unlike in the achromatic color/chromatic color determination unit 1201 that receives R, G, and B signals. However, as described above, since the saturation signal S is generated by inputting the chromaticity signals (Ca1, Cb1) for three lines delayed by the delay unit 103 to the saturation amount extraction unit 114, the saturation signal S and chromaticity signals (Ca1, Cb1) as the original signals of the signal S may be input to the achromatic color/chromatic color determination unit 115 (at that time, the signals (Ca1, Cb1) input to the saturation amount extraction unit 114 in FIG. 1 may also be input to the achromatic color/chromatic color determination unit 115 together with the saturation signal S).

The above-mentioned delay unit 103, and the edge emphasis amount extraction unit 113, saturation amount extraction unit 114, and achromatic color/chromatic color determination unit 115 as the peripheral units of the delay unit 103 will be described in detail below with the aid of FIG. 3.

The lightness signal L1 and chromaticity signals (Ca1, Cb1) output from the first color space conversion unit 102 are input to the delay unit 103, and line memories 801 to 804 that constitute the delay unit 103 store lightness signals L1 for four lines, and line memories 805 and 806 store chromaticity signals for two lines and line memories 807 and 808 store chromaticity signals Cb1 for two lines so as to be synchronized with the central pixel of the lightness signals.

Assuming that line j represents the central line, lightness signals for lines j−2, j−1, j, and j+1 are stored, and lightness signals for five lines including the current line j+2 are input to the edge emphasis amount extraction unit 113. In this manner, the lightness signals are stored in the same manner as in the above-mentioned prior art shown in FIG. 13.

On the other hand, as for the chromaticity signal Ca1, the line memories 805 and 806 of the delay unit 103 store lines j and j+1, and chromaticity signals for three lines including the current line j+2 are input to the saturation amount extraction unit 114 and achromatic color/chromatic color determination unit 115. Also, chromaticity signals Cb1 are similarly input to the saturation amount extraction unit 114 and achromatic color/chromatic color determination unit 115. More specifically, in the embodiment of the present invention, although each of the chromaticity signals Ca1 and Cb1 requires line memories for two lines, i.e., memories for a total of four lines are required, since the chromaticity signals Ca1 and Cb1 do not undergo any spatial filter processing, neither multipliers nor adders are required for the chromaticity signals Ca1 and Cb1.

Furthermore, in the embodiment of the present invention, upon calculations of the saturation signal S and the achromatic color/chromatic color determination signal KC, the calculation methods using equations (2) and (3) above may be accomplished by spatial processing using data for three lines, i.e., lines j, j+1, and j+2.

For example, the saturation signal S may be represented by an average value obtained by averaging saturation signals of neighboring pixels of 3×3 size, and the achromatic color/chromatic color determination signal KC may be represented by a representative value KC obtained by statistically processing determination results of neighboring pixels of 3×3 size. Either of the above-mentioned methods may be used.

A method of obtaining the saturation signal S by spatial processing, and calculating the determination signal KC on the basis of the obtained saturation signal S will be explained below. With this method, if the saturation signal S is small, it is determined that the pixel of interest is a monochrome pixel (achromatic pixel); if the saturation signal S is large, it is determined that the pixel of interest is a color pixel (chromatic color). Simply stated, the determination signal KC is determined by relations (4) below using a predetermined threshold value or slice level ρ:

(When $S<\rho$)$KC$=achromatic color (When $\rho \leq S$)$KC$=chromatic color  (4)

A process for generating edge emphasis correction amounts ϵl and ϵc on the basis of the edge emphasis amount ϵ, the saturation signal S, and the achromatic color/chromatic color determination signal KC input to the edge emphasis amount distribution unit 116 will be explained below.

The edge emphasis correction amount ϵl for the lightness signal L1 will be explained below. In this embodiment, as the saturation is lower (closer to an achromatic color), a larger edge emphasis amount ϵ is distributed to the lightness signal, and for an achromatic color signal pixel, a full edge emphasis amount ϵ is assigned to ϵl. On the other hand, for a pixel having a saturation level equal to or higher than a predetermined slice level, no edge correction for the lightness signal is done.

Figure 4:
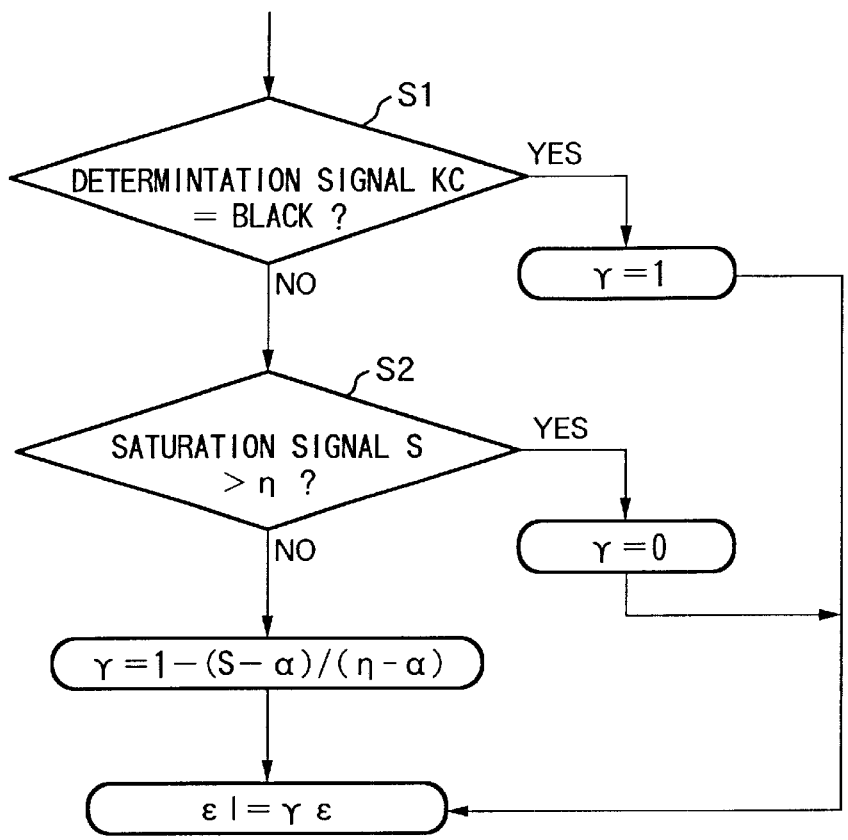
FIG. 4 is a flow chart showing the edge emphasis correction amount generation processing for a lightness signal by an edge emphasis amount distribution unit in the embodiment of the present invention.
Figure 5:
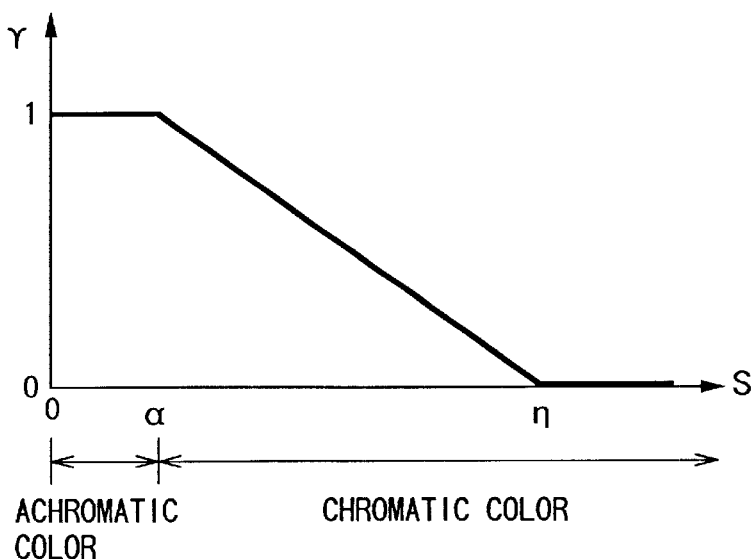
FIG. 5 is a graph showing the edge emphasis correction amount with respect to the lightness signal determined by the edge emphasis amount distribution unit in the embodiment of the present invention.

The edge emphasis correction amount generation processing for the lightness signal by the edge emphasis amount distribution unit in the embodiment of the present invention will be described below with reference to the flow chart in FIG. 4 and the graph in FIG. 5. FIG. 4 is a flow chart showing the edge emphasis correction amount generation processing for the lightness signal by the edge emphasis amount distribution unit in the embodiment of the present invention, and FIG. 5 is a graph showing the edge emphasis correction amount for the lightness signal determined by the edge emphasis amount distribution unit in the embodiment of the present invention.

In STEP 1 in FIG. 4, the achromatic color/chromatic color determination signal KC is checked, and the flow branches depending on whether the achromatic color/chromatic color determination signal KC of the pixel of interest indicates an achromatic color (black) or a chromatic color. If the determination signal KC indicates an achromatic color (STEP1—YES direction in FIG. 4), a full edge emphasis amount $\epsilon$ is assigned to $\epsilon l$, and $\gamma=1$ is set.

On the other hand, if the determination signal KC indicates a chromatic color (STEP1—NO direction in FIG. 4), the flow advances to STEP 2 to check the vividness of the pixel of interest using the saturation signal S. If the pixel of interest has a saturation level higher than a predetermined slice level $\eta$ (STEP 2—YES direction in FIG. 4), $\epsilon l=0$ is set to inhibit edge correction of the lightness signal ($\gamma=0$). This is based on empirical rules that a pixel with a high saturation level can have a higher edge effect if lightness is maintained to stress saturation.

On the other hand, if it is determined in STEP 2 that the pixel of interest has a saturation level lower than the predetermined slice level $\eta$, and the saturation level is too high to be determined as an achromatic color (STEP 2—NO direction in FIG. 4), values are continuously plotted between $\epsilon l=0$ and $\epsilon l=\epsilon$ using a predetermined second slice level $\alpha$ in accordance with the following equations (5):

$$\epsilon l=(1-(S-\alpha)/(\eta-\alpha))\epsilon$$

$$\gamma=(1-(S-\alpha)/(\eta-\alpha)) \quad (5)$$

FIG. 5 is a graph showing the transition of $\gamma$. In FIG. 5, the abscissa plots the saturation, and the ordinate plots the $\gamma$. When the saturation falls within the range from 0 to a saturation value (slice level $\alpha$) at which it is determined as an achromatic color, $\epsilon l=\epsilon$ is set, and $\gamma=1$. On the other hand, when the saturation falls within the range from the slice level $\alpha$ to $\eta$, $\gamma$ continuously decreases in accordance with $\gamma=(1-(S-\alpha)/(\eta-\alpha))$ as the saturation becomes higher.

When the saturation is higher than the slice level $\eta$, $\epsilon l=0$ is set, and $\gamma=0$.

The edge emphasis correction amount $\epsilon c$ for the chromaticity signals (Ca1, Cb1) will be explained below. As for the chromaticity signals, contrary to the lightness signal in principle, as the saturation is higher (vividness is higher), a larger edge emphasis amount $\epsilon$ is distributed to each chromaticity signal. Also, no edge correction is done for an achromatic color signal pixel, and the chromaticity signals of the pixel of interest are removed at that time.

This is because, in an image processing apparatus such as a color copying machine, residual color components in copied images such as black characters or the like result in visually very poor image quality. Hence, such pixels must be color-corrected to completely achromatic color signals by cutting their chromatic components.

Figure 6:
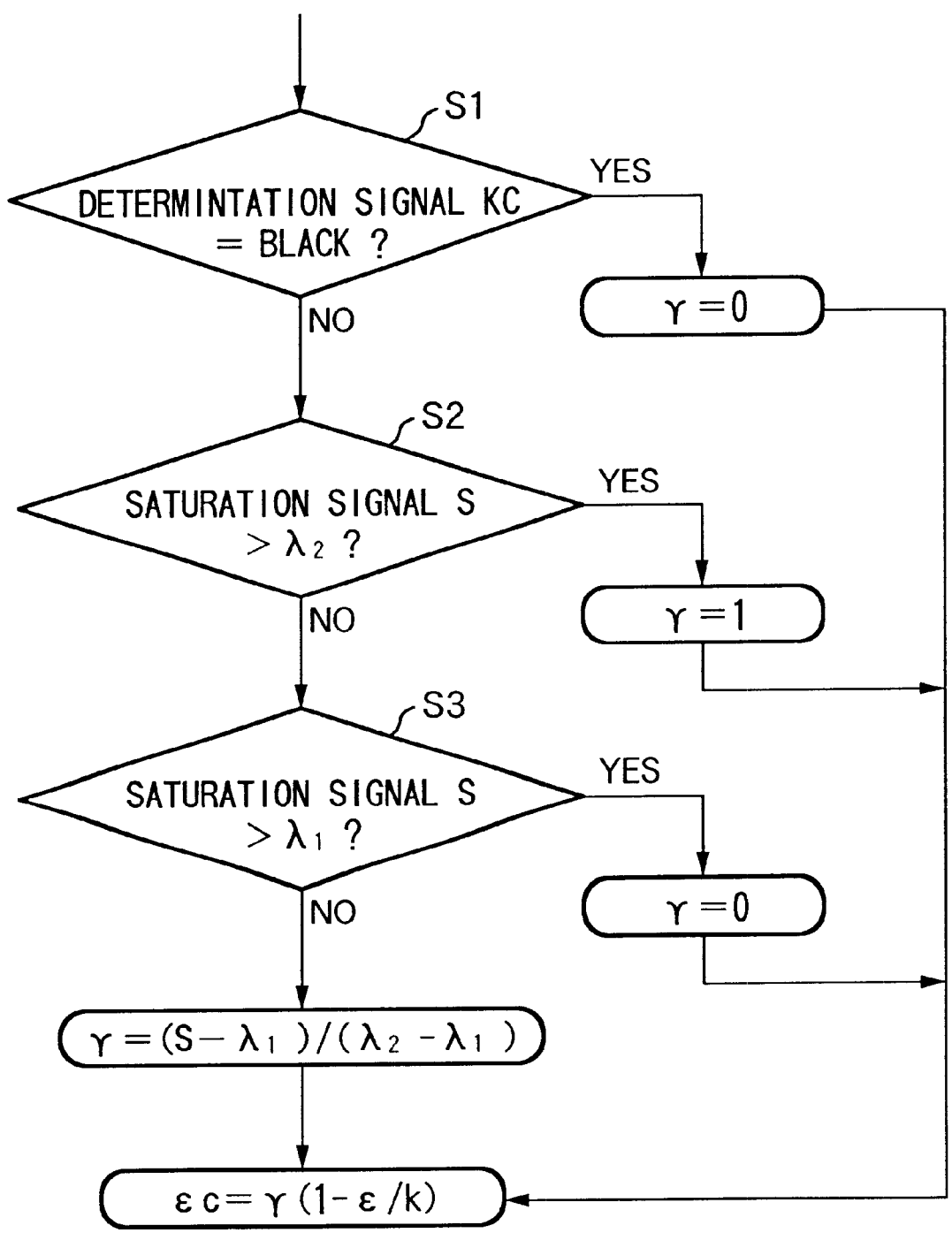
FIG. 6 is a flow chart showing the edge emphasis correction amount generation processing for a chromaticity signal by the edge emphasis amount distribution unit in the embodiment of the present invention.
Figure 7:
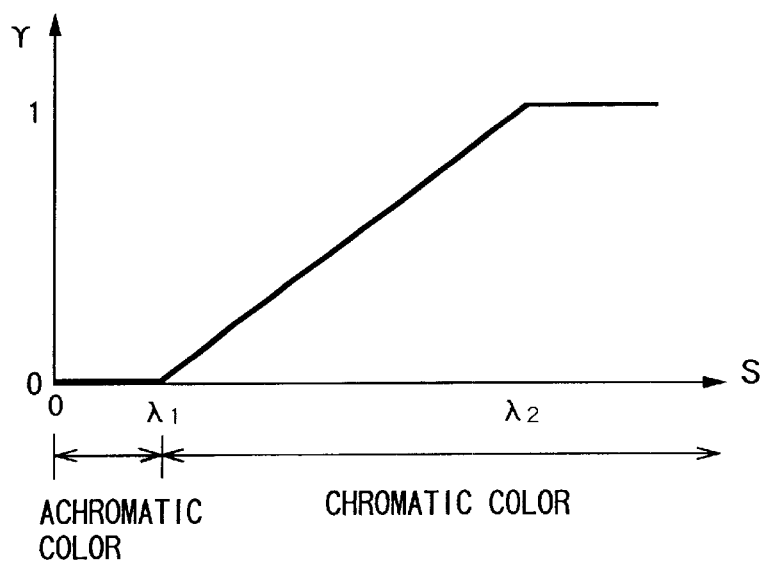
FIG. 7 is a graph showing the edge emphasis correction amount with respect to the chromaticity signal determined by the edge emphasis amount distribution unit in the embodiment of the present invention.

This process will be explained below with the aid of the flow chart in FIG. 6, and the graph in FIG. 7. FIG. 6 is a flow chart showing the edge emphasis correction amount generation processing for chromaticity signals by the edge emphasis amount distribution unit in the embodiment of the present invention, and FIG. 7 is a graph showing the edge emphasis correction amount for chromaticity signals in the edge emphasis amount distribution unit in the embodiment of the present invention.

In STEP 1 in FIG. 6, the achromatic color/chromatic color determination signal KC is checked, and the flow branches depending on whether the achromatic color/chromatic color determination signal KC of the pixel of interest indicates an achromatic color (black) or a chromatic color. If the determination signal KC indicates an achromatic color (STEP1—YES direction in FIG. 6), an edge emphasis amount $\epsilon$ is set at 0 ($\gamma=0$), as described above.

On the other hand, if the determination signal KC indicates a chromatic color (STEP 1—NO direction in FIG. 6), the flow advances to STEP 2 to check the vividness of the pixel of interest using the saturation signal S. If the saturation of the pixel of interest is higher than a predetermined slice level $\lambda 2$ (STEP 2—YES direction in FIG. 6), a full edge emphasis amount $\epsilon$ is assigned to $\epsilon c$ to set $\epsilon c=\epsilon$ ($\gamma=1$).

On the other hand, if the pixel of interest has saturation which is lower than the predetermined slice level $\lambda 2$ and is too high to be determined as an achromatic color (STEP 2—NO direction in FIG. 6), values are continuously plotted between $\gamma=0$ and $\gamma=1$ using a predetermined second slice level $\lambda 1$ in accordance with the following equation (6):

$$\gamma=(S-\lambda 1)/(\lambda 2-\lambda 1) \quad (6)$$

Furthermore, the edge emphasis correction amount $\epsilon c$ for each chromaticity signal is obtained in accordance with the following equation (7):

$$\epsilon c=\gamma(1-\epsilon/k) \quad (7)$$

(where k is a normalization constant.)

FIG. 7 is a graph showing the transition state of $\gamma$. In FIG. 7, the abscissa plots the saturation, and the ordinate plots the $\gamma$. When the saturation falls within the range from 0 to a saturation value (slice level $\lambda 1$) at which it is determined as an achromatic color, $\epsilon c=0$ is set, and $\gamma=0$. When the saturation falls within the range between the slice levels $\lambda 1$ and $\lambda 2$, $\gamma$ continuously increases ($\gamma=(S-\lambda 1)/(\lambda 2-\lambda 1)$) as the saturation becomes higher. When the saturation is higher than the slice level $\lambda 2$, $\epsilon c=\epsilon$ is set, and $\gamma=1$.

The edge emphasis correction amounts $\epsilon l$ and $\epsilon c$ generated as described above are input to an edge emphasis unit 104 together with the signals L, Ca, and Cb. In accordance with equations (8) below, the edge emphasis unit 104 adds the edge emphasis correction amount $\epsilon l$ to the lightness signal L, and multiplies the chromaticity signals Ca and Cb by the edge emphasis correction amount $\epsilon c$:

$$L2=\epsilon+L1$$

$$Ca2=\epsilon c*Ca1$$

$$Cb2=\epsilon c*Cb1 \quad (8)$$

As can be seen from equations (8), by adding the edge correction amount $\epsilon l$ to the signal L, lightness can be preserved in a pixel ($\epsilon l=0$) which has high saturation and in which lightness is not to be edge-emphasized.

On the other hand, the signals Ca and Cb are multiplied by the edge correction amount $\epsilon c$. Especially, since a pixel which has low saturation and is determined to be an achromatic color is multiplied by $\epsilon c=0$, the chromaticity components themselves of the pixel of interest can be removed.

Figure 8:
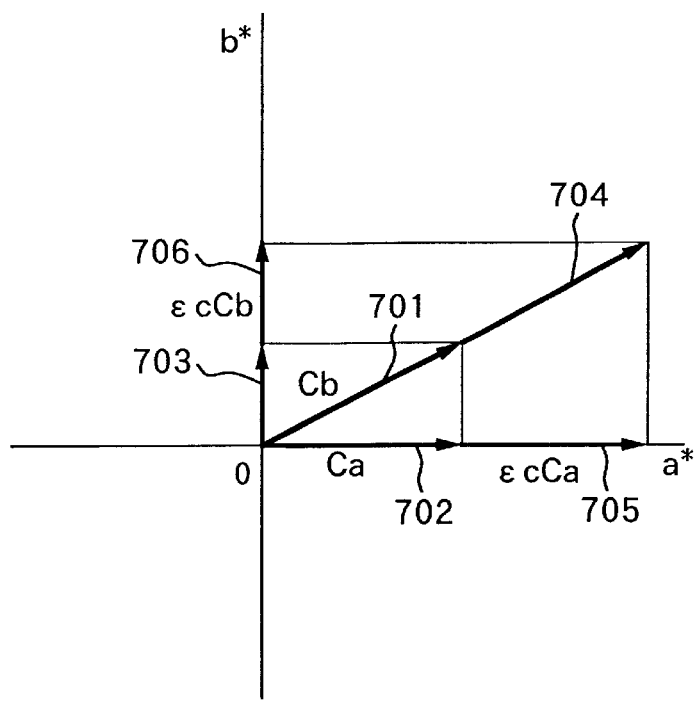
FIG. 8 is a graph for explaining preservation of the color tone (hue) of the chromaticity signal against edge emphasis in the embodiment of the present invention.

Preservation of the color tone (hue) of chromaticity signals against edge emphasis will be explained below with reference to FIG. 8. FIG. 8 is a graph for explaining preservation of the color tone (hue) of chromaticity signals against edge emphasis in the embodiment of the present invention, and shows a chromaticity coordinate system defined by plotting the chromaticity signals (Ca1, Cb1) along coordinate axes.

In the following description, the Ca and Cb axes are assumed to be the a* and b* axes in the CIE1976 (L*a*b*) color space, for the sake of simplicity. An intersection O of the a* and b* axes represents an achromatic color. As the saturation is farther from the intersection O, it is higher; the angle a color makes with the a* axis indicates a color tone (hue).

Assuming that the pixel of interest has chromaticity signals Ca1 (702) and Cb1 (703), this color is expressed by a vector 701 on the chromaticity coordinate system.

Edge-emphasized signals (Ca2, Cb2)=($\epsilon$cCa1, $\epsilon$cCb1) obtained by multiplying the chromaticity signals (Ca1, Cb1) by the edge emphasis amount $\epsilon$c in accordance with equations (8) above are expressed by a vector 704 on the chromaticity coordinate system. As shown in FIG. 8, the angle the color makes with the a* axis remains the same, and the color tone (hue) is preserved before and after edge emphasis. That is, in this embodiment, upon edge emphasis the vividness is emphasized, but the color tone remains the same.

The signals L2, Ca2, and Cb2 edge-emphasized by the edge emphasis unit 104 are input from the edge emphasis unit 104 to a second color space conversion unit 105, and are inversely converted into R, G, and B signals again.

Equations (9) are an example of conversion formulas for converting the lightness and chromaticity signals L2, Ca2, and Cb2 into three color-separated signals R2, G2, and B2 in the second color space conversion unit 105, and are inverse conversion coefficients of equations (1):

$$R=(4L+4Ca+4Cb)/4$$
$$G=(4L-3Ca+2Cb)/4$$
$$B=(4L+Ca-6Cb)/4 \qquad (9)$$

Subsequently, the three color-separated signals inversely converted into R, G, and B signals are input to the luminance/density conversion unit 106, and are converted into density signals C1, M1, and Y1. The density signals C1, M1, and Y1 are supplied to the color correction unit 107, and are subjected to color processing such as generation of a black signal K, undercolor removal, color correction, and the like, thus outputting density signals C2, M2, Y2, and K2.

In the embodiment of the present invention, the determination signal KC as the determination result of the achromatic color/chromatic color determination unit 115 and the determination signal TI as the determination result of the character/halftone image determination unit 111 are input to a black character/color character/image determination unit 117 to finally check if the pixel of interest corresponds to a black character, color character, or halftone image. The determination result of the black character/color character/image determination unit 117 is output as a black character/color character/image determination signal TC, and is input to the color correction unit 107. For this reason, the color correction unit 107 changes the color correction mode in accordance with the black character/color character/image determination signal TC.

For example, the unit 107 performs color correction for a halftone image while placing an importance on the color reproducibility of a highlight portion, and performs color correction for color and black character signals independently of highlight reproduction by removing undercolors.

Similarly, the binarization unit 108 and the smoothing/resolution conversion unit 109 do their processing with reference to the determination signal TI as the determination result of the character/halftone image determination unit 111, and image signals C4, M4, Y4, and K4 finally output from the smoothing/resolution conversion unit 109 are sent to the color image output unit 110, thus printing out a color image.

As described above, according to the embodiment of the present invention, an edge amount for a lightness component is extracted, and the extracted edge amount is distributed to lightness and chromaticity signals in correspondence with the saturation component to accomplish edge emphasis correction. When the achromatic color/chromatic color determination unit determines an achromatic color image, the edge emphasis unit performs correction for removing chromaticity components from the chromaticity signals to realize an image expressed by black color alone. In this manner, the number of line memories required in edge emphasis correction can be greatly reduced as compared to the prior art. For example, 12 lines required in the prior art can be reduced to eight lines, and the number of line memories can be reduced to $\frac{2}{3}$ that required in the prior art.

Furthermore, the number of multipliers can be reduced to 25 (75 multipliers are required in the prior art), i.e., to $\frac{1}{3}$. Also, the number of adders can be reduced to 24 (72 adders are required in the prior art), i.e., to $\frac{1}{3}$, too. In this manner, the circuit scale can be greatly reduced.

On the other hand, since color difference signals delayed by the delay unit are used, chromaticity signals can be subjected to spatial image processing without adding any new delay circuits. When the pixel of interest is determined to be an achromatic color, correction for removing chromaticity components from the chromaticity signals is performed, thus reducing the cost load associated with edge emphasis without deteriorating image quality. In addition, an achromatic color signal can be converted into black color alone while preserving its image density. In this manner, image quality can be improved.

(Second Embodiment)

The second embodiment of the present invention will be described in detail hereinafter with reference to FIG. 9. The same reference numerals in FIG. 9 denote the same parts as those in the first embodiment of the present invention shown in FIG. 1, and a detailed description thereof will be omitted. In the second embodiment, the difference from the first embodiment shown in FIG. 1 is that an original image color determination unit 901 is added to the arrangement of FIG. 1.

Figure 9:
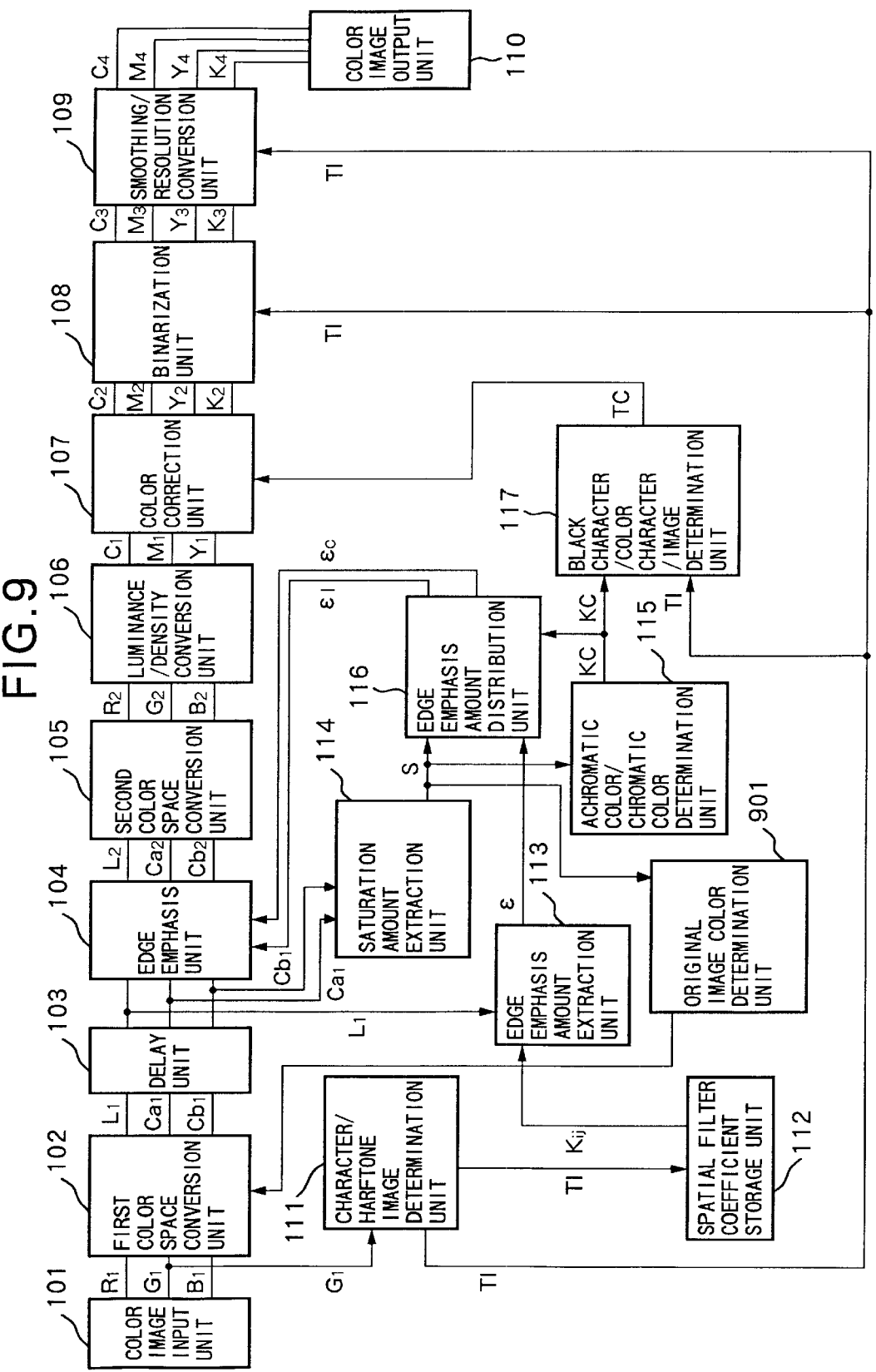
FIG. 9 is a block diagram showing the arrangement of an image processing apparatus according to the second embodiment of the present invention.

The second embodiment of the present invention with the arrangement shown in FIG. 9 assumes a case wherein color image processing is executed in a color copying machine, and performs original color determination in advance to check if the original to be copied is a color original or a monochrome original.

When the original image color determination unit 901 determines in advance if the original to be copied is a color original or a monochrome original, the entire surface of the original image (pre-scan) is read prior to original reading for actual copying. When the pre-scan is started, and a color image input unit 101 reads an original image, three color-separated signals R1, G1, and B1 of each pixel of the read original image are input to a first color space conversion unit 102, and are converted into a lightness signal L1 and chromaticity signals (Ca1, Cb1). The chromaticity signals (Ca1, Cb1) are sent to a saturation amount extraction unit 114 via a delay unit 113, and the saturation amount extraction unit 114 extracts the saturation amount, thus outputting a saturation signal S.

The saturation signals S of the individual pixels are input to the original image color determination unit 901, which performs statistical processing of the saturation signals S for the entire surface of the original image to check in advance if the original to be copied is a color original or a monochrome original. As an example of the statistical processing of saturation signals S in the original image color determination unit 901, a histogram of the saturation signals S is calculated for the entire surface of the original image, and is discriminated using a slice level.

FIG. 10 shows the histograms of saturation signals S for a monochrome image original and a color image original. In the monochrome image original shown in the upper portion of FIG. 10, accumulated pixels 1001 represent an undercolor (white) portion and an image portion of the monochrome image original. In both these portions, pixels are concentrated where saturation=0, and there are no accumulated pixels in a region with higher saturation S (color image region).

On the other hand, in the lower histogram, accumulated pixels 1002 represent an undercolor (white) portion and an achromatic color image portion of the color image original, and accumulated pixels 1003 of a color image portion are also distributed.

As an example of the method of discriminating the difference between such originals, it is checked if accumulated pixels N equal to or higher than a predetermined slice level (N≧Th) are present in the color image region (S≧Sth) in the histogram. In the second embodiment, when the accumulated pixels N equal to or higher than the predetermined slice level are present in the color image region (S≧Sth) (1003), the image original is determined to be a color image original; when accumulated pixels equal to or higher than the predetermined threshold (N≧Th) are not present in the color image region (S≧Sth), the image original is determined to be a monochrome image original.

The determination result of the original image color determination unit 901 is input to the first color space conversion unit 102. Thereafter, a main scan is executed. At this time, when the determination result of the original image color determination unit 901 indicates a monochrome image original, the first color space conversion unit 102 forcibly outputs Ca=Cb=0, thereby converting three color-separated signals R1, G1, and B1 into completely achromatic color signals.

Thereafter, as described in the first embodiment above, in the achromatic color image, the lightness signal L alone is edge-emphasized. However, in the second embodiment, the color difference signals are Ca=Cb=0 even after edge emphasis. Furthermore, luminance-density conversion, color correction processing, binarization, smoothing/resolution conversion, and the like are performed, and a color image output unit 109 comprising, e.g., an electrophotography printer generates an output in black color alone, thus completing monochrome copying.

On the other hand, when the determination result of the original image color determination unit 901 indicates a color image original, the same processing as in the first embodiment described above is executed.

As described above, according to the second embodiment, the same effect as in the first embodiment described above can be achieved. Furthermore, since the original image color determination unit 901 checks in advance if the original to be copied is a color original or monochrome original, the color difference signals of a monochrome image can be set to be Ca=Cb=0 even after edge emphasis, and chromaticity components can be reliably removed, thus reducing the cost load associated with edge emphasis without deteriorating image quality. Also, an achromatic signal can be expressed by black color alone with a proper image density. In this manner, image quality can be improved.

When the determination result indicates a monochrome image original, C2=M2=Y2=0 of the outputs from a color correction unit 107 may be set.

(Third Embodiment)

Figure 11:
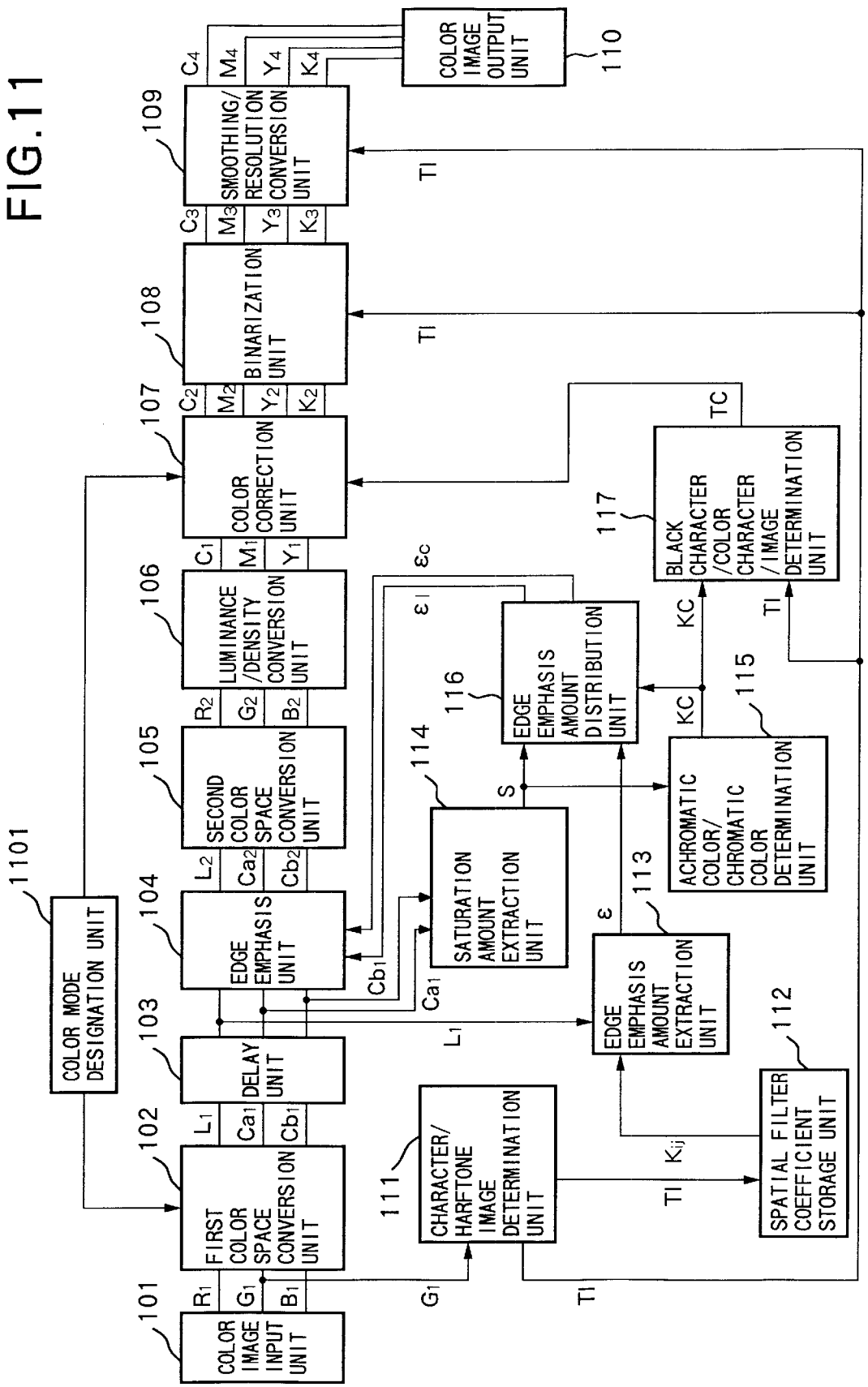
FIG. 11 is a block diagram showing the arrangement of an image processing apparatus according to the third embodiment of the present invention.

The third embodiment of the present invention will be described in detail hereinafter with reference to FIG. 11. The same reference numerals in FIG. 11 denote the same parts as in the first embodiment shown in FIG. 1, and a detailed description thereof will be omitted. In the third embodiment, the difference from the first embodiment shown in FIG. 1 is that a color mode designation unit 1101 is added to the arrangement shown in FIG. 1. The color mode designation unit 1101 has a key input unit that allows operation inputs by an operator. The operator can designate and input, using the key input unit, whether the image to be output from a color image output unit 110 is output in a full-color mode or a black-and-white (monochrome) mode.

In the following description, designation as to whether the copied image is to be output in the full-color mode or in the monochrome mode (including a black-and-white image) upon execution of color image processing in a color copying machine of the third embodiment, and an example of image processing associated with the designation will be explained.

In the third embodiment, when the copied original image is output in the monochrome mode, the output color is designated at the color mode designation unit 1101 prior to copying. More specifically, one of the full-color mode and monochrome mode, and a monochrome hue are designated using the key input unit of the color mode designation unit 1101.

When the monochrome mode and hue are designated at the color mode designation unit 1101, a monochrome designation signal is output, and is input to a first color space conversion unit 102. Also, a hue designation signal is output from the color mode designation unit 1101, and is input to a color correction unit 107.

When the monochrome designation signal is input to the first color space conversion unit 102, the first color space conversion unit 102 converts the input three color-separated signals of the original image into achromatic color signals including chromaticity signals Ca=Cb=0. With this processing, the color original image is converted into a monochrome original image (achromatic color image) having only lightness gradation.

Thereafter, a lightness signal L alone is edge-emphasized as in the first embodiment, and a luminance/density conversion unit 106 generates density signals C1, M1, and Y1 (C1=M1=Y1).

When the hue designation signal is input to the color correction unit 107, the unit 107 performs color correction for reproducing the designated color. For example, when cyan is designated as the hue, the color correction unit 107 outputs only a cyan signal C2 (M2=Y2=K2=0). On the other hand, when red (mixed color of magenta and yellow) is designated as the hue, the color correction unit 107 outputs only magenta and yellow signals M2 and Y2 (C2=K2=0)

The generated monochrome signal is subjected to binarization, smoothing/resolution conversion, and the like as in the first and second embodiments, and a color image output unit 110 comprising, e.g., an electrophotographic printer prints out a monochrome image.

As described above, in the third embodiment as well, the same effect as in the second embodiment can be achieved. Also, since a desired monochrome hue can be designated, an image with a desired hue can be accurately output.

In the first to third embodiments described above, edge emphasis has been exemplified as correction of spatial frequency characteristics. Also, the same applies to smoothing.

In the above embodiments, the spatial filter coefficients are controlled in accordance with the character/halftone image determination result, but may be controlled in accordance with, e.g., a character/image/halftone dot screen determination result.

As described above, according to the first to third embodiments of the present invention, the numbers of circuit components such as line memories, multipliers, adders, and the like required in edge emphasis correction can be greatly reduced as compared to the prior art.

Since image processing is done using color difference signals delayed by the delay unit, spatial image processing for chromaticity signals can be realized without adding a new delay circuit. When the pixel of interest is determined to be an achromatic color, correction for removing chromaticity components is performed for chromaticity signals, thereby reducing the cost load associated with edge emphasis without deteriorating image quality. In addition, an achromatic color signal can be converted into one expressed by black color alone with a proper image density. In this manner image quality can be improved.

Hence, according to the first to third embodiments, an image processing apparatus and method, which can perform spatial frequency characteristic correction such as edge emphasis or the like performed while suppressing deterioration of image quality, and can reduce the cost load associated with the correction, can be provided.

Also, an image processing apparatus and method which can convert an achromatic color signal into one expressed by black color alone with a proper image density can be provided.

(Fourth Embodiment)

In general, in a color image processing apparatus, especially, in a color copying machine, when an image corresponding to a monochrome original is to be formed and output, the image is copied using four colors, i.e., C (cyan), M (magenta), Y (yellow), and K (black). However, in the case of a laser beam printer, in consideration of the service life of a drum and consumption of toner, the image corresponding to the monochrome original is preferably copied using black color alone. The same applies to a copying machine that incorporates an ink-jet printer.

For this reason, the copying machine is required to have a processing unit for determining if the input original is a color or monochrome original. Conventionally, such processing is realized by simple evaluation, i.e., by summing up the color pixels of an input original and performing simple statistical processing of the sum or comparing the sum with a slice level.

However, when color pixel determination is done based on color components (in this case, R, G, and B luminance values) in units of pixels in an original input device, if the reading elements for the individual color components cannot read perfectly the same pixel positions in an original, i.e., they are shifted by a small distance, a so-called pixel shift phenomenon occurs, and this finally results in "color misregistration". In particular, since recent image scanners tend to have higher reading precision (resolution), the above-mentioned problem is inevitable.

As can be understood from the above reason, when an image scanner reads a uniform original (e.g., white paper), color misregistration does not show even if the reading position of the image scanner has shifted.

The problem is noted in the vicinity of the edge in, e.g., a black character or line image (to be referred to as a black character hereinafter). If color misregistration has occurred at the edge of a black character due to pixel shift, the pixel at that position is determined to be a chromatic pixel. Hence, the above-mentioned simple statistical processing or comparison between the number of pixels and the slice level may determine a color original if the original includes many characters.

As a consequence, an image that must be copied using black color alone is copied using C, M, Y, and K.

The fourth embodiment is achieved in consideration of the above problems, and can satisfactorily and accurately discriminate if the input image is a color image or monochrome image, even if color misregistration has taken place.

Figure 16:
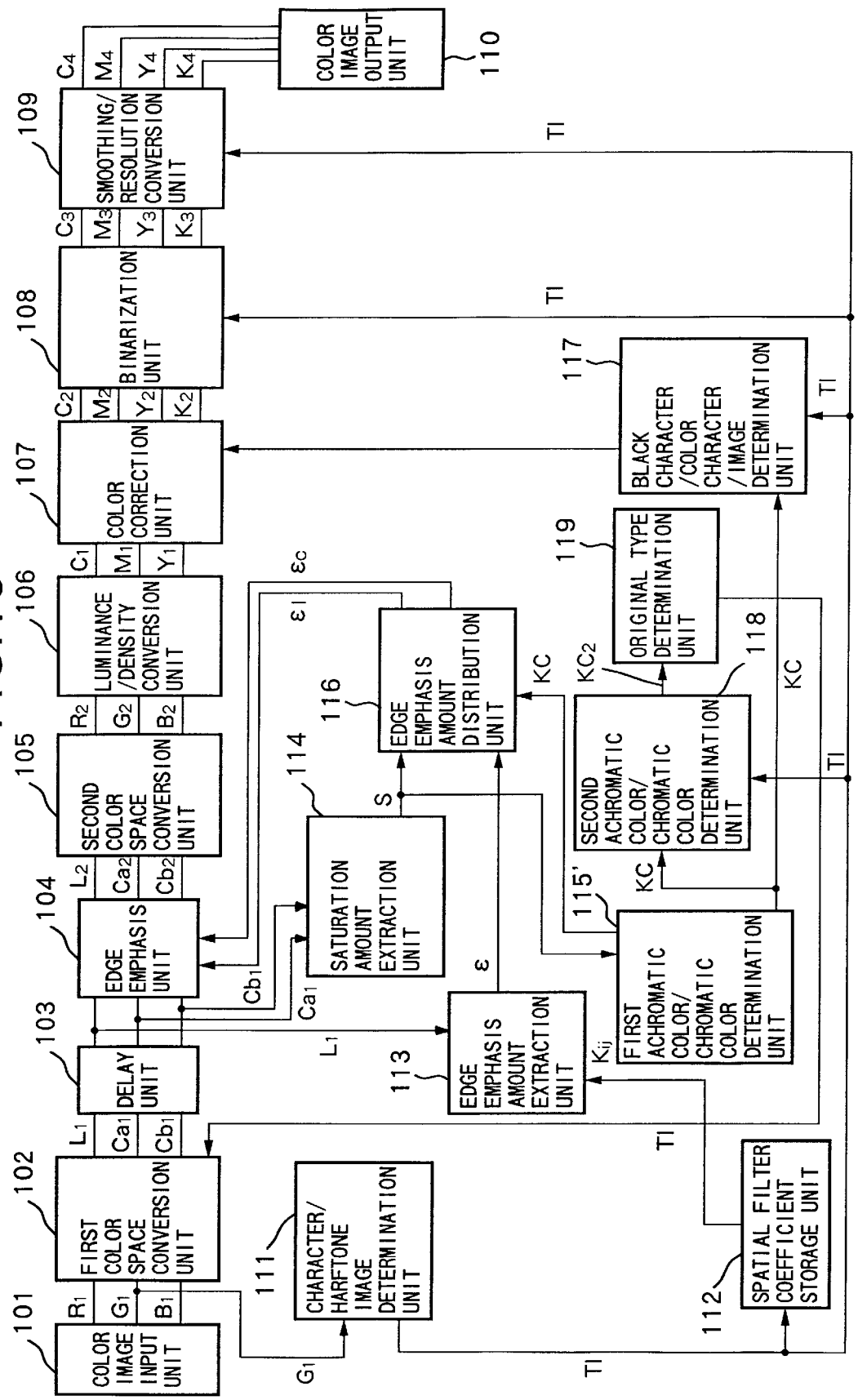
FIG. 16 is a block diagram showing the arrangement of an image processing apparatus according to the fourth embodiment of the present invention.

FIG. 16 is a block diagram showing the arrangement of an image processing unit (see FIG. 15) in the fourth embodiment.

Note that the same reference numerals in the fourth embodiment denote the same processing units as those in the first to third embodiments described above, and a detailed description thereof will be omitted. That is, signals TI, Kij, L1, Ca1, Cb1, $\epsilon$, S, KC, $\epsilon$l, and $\epsilon$c in FIG. 16 are the same as those in FIG. 1 in the first embodiment. Accordingly, as for the arrangements of the processing units that generate these signals, the first embodiment is quoted. An arrangement unique to the fourth embodiment will be explained hereinafter.

The arrangement of the fourth embodiment is characterized in that the fourth embodiment comprises a first achromatic color/chromatic color determination unit 115' that performs processing equivalent to that in the chromatic color/achromatic color determination unit 115 in the first to third embodiments, and a second achromatic color/chromatic color determination unit 118 and an original type determination unit 119 that are unique to the fourth embodiment. The arrangement and processing contents of the first achromatic color/chromatic color determination unit 115' are the same as those in the first to third embodiments described above.

In the fourth embodiment, an original image is read by two scans. The first scan is a pre-scan for determining the original type, and the second scan is a main scan for copying.

The processing executed in the fourth embodiment is done for an image pre-scanned or back-scanned (original scanning performed during the return process of an image scanner to its home position) prior to copying. When the processing result of the units of this embodiment is fed back to a first color space conversion unit shown in FIG. 16, whether the input original is to be processed using black color alone or four colors is determined. This processing is attained by the second achromatic color/chromatic color determination unit 118 and the original type determination unit 119.

The second achromatic color/chromatic color determination unit 118 will be explained below.

As described above, signals processed and generated by the individual units with respect to an image obtained by pre-scanning an original image are supplied to the constituting elements of this embodiment. The individual processing units of this embodiment execute processing on the basis of a signal KC output from the first achromatic color/chromatic color determination unit 115' and a signal TI output from a character/halftone image determination unit 111 shown in FIG. 16.

Figure 17:
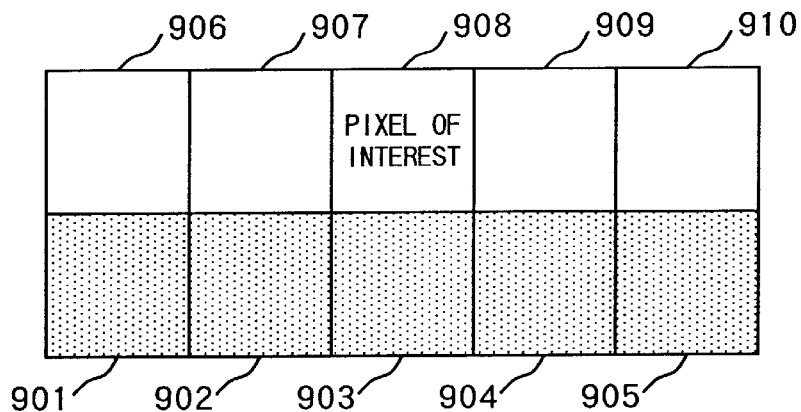
FIG. 17 shows a pixel shift region in the fourth embodiment.

Reference numerals 901 to 910 in FIG. 17 denote important pixel portions in color original detection, i.e., pixels corresponding to the edge portion of a black character and those adjacent thereto. The pixels 901 to 905 are determined as those corresponding to the edge portion of the black character, and the signals KC and TI respectively indicating an achromatic color and a character are sent to the second achromatic color/chromatic color determination unit 118.

Assume that the pixel 908 in FIG. 17 is the pixel of interest. As can be understood from the above description, the pixel 908 corresponds to a pixel shift region upon inputting an image or a region where pixel shift is likely to occur. The pixel 908 may be correctly determined to be an achromatic color by the first achromatic color/chromatic color determination unit 115' in FIG. 16, but it is often hard to avoid determination errors if the pixel shift amount of the scanner increases. However, if it is known in advance that the pixel 908 of interest is present in a region where pixel shift is likely to occur, determination errors due to pixel shift can be eliminated using this information.

Figure 18:
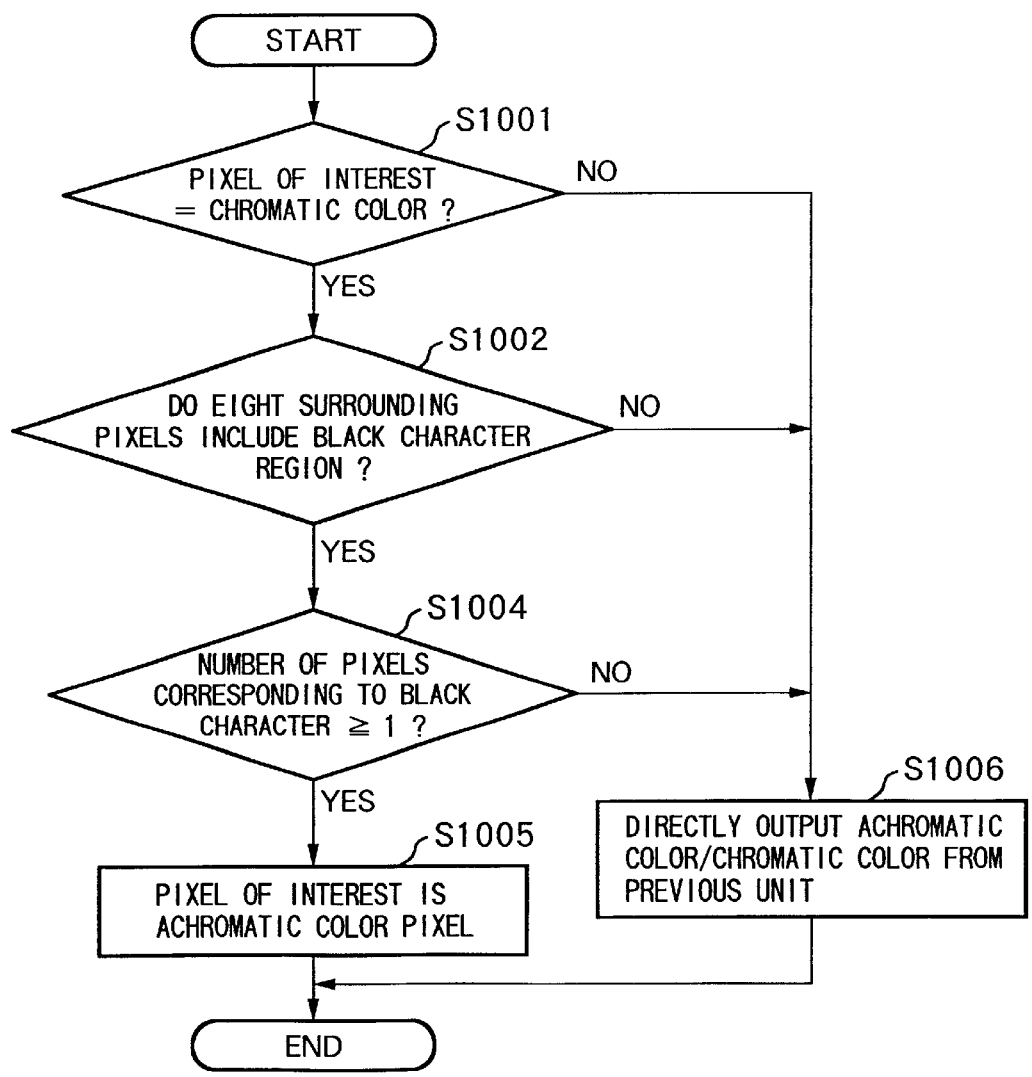
FIG. 18 is a flow chart showing the determination processing of a second achromatic color/chromatic color determination unit in the fourth embodiment.

Subsequently, the processing of the second achromatic color/chromatic color determination unit 118 will be described in detail below with the aid of FIG. 18.

Initially, it is checked if the signal KC of the pixel of interest indicates a chromatic color (step S1001). If YES in step S1001, it is then checked based on signals TI and KC of eight surrounding pixels if the surrounding pixels include those indicating a character and an achromatic color (step S1002). That is, it is determined that the edge portion of a black character is detected. At this time, if the number of pixels determined to be black character pixels among the surrounding pixels is, for example, equal to or larger than one pixel, it is determined that the pixel of interest is present at a position where so-called pixel shift is likely to occur (S1004). In this case, the color of the pixel of interest is determined to be an achromatic color and the determination result is supplied to the subsequent original type determination unit 119 (step S1005). If the pixel of interest does not satisfy the above-mentioned conditions, the signal from the first and second achromatic color/chromatic color determination units is directly supplied to the subsequent original type determination unit (step S1006).

More specifically, when the signal KC at the position of the pixel of interest from the first achromatic color/chromatic color determination unit 115' indicates a chromatic color, the second achromatic color/chromatic color determination unit 118 checks the probability of the signal KC. If the signal KC corresponding to the pixel of interest indicates a chromatic color, the unit 118 checks signals KC and TI of eight surrounding pixels around the pixel of interest. If these pixels include at least one pixel indicating an achromatic color and a character/line image, since the signal KC corresponding to the pixel of interest is erroneously determined to be a chromatic color owing to pixel shift, an output signal KC2 is unconditionally set to indicate an achromatic color to correct the signal KC and is output to the subsequent original type determination unit 119. On the other hand, if NO is determined in steps S1001, S1002, and S1004 in FIG. 18, the input signal KC corresponding to the pixel of interest is directly output as a signal KC2.

Note that the second achromatic color/chromatic color determination unit 118 has a memory for holding signals KC and TI corresponding to the pixel of interest and its eight surrounding pixels (i.e., a total of nine pixels), as described above.

The original type determination unit 119 will be explained below. The processing in the original type determination unit 119 will be briefly described below. That is, the unit 119 sums up signals output as a chromatic color from the above-mentioned second achromatic color/chromatic color determination unit 118, and finally determines the color of the original. That is, the unit 119 counts the number of pixels determined as chromatic color pixels. This processing will be explained below with reference to FIGS. 19 to 23.

Figure 19:
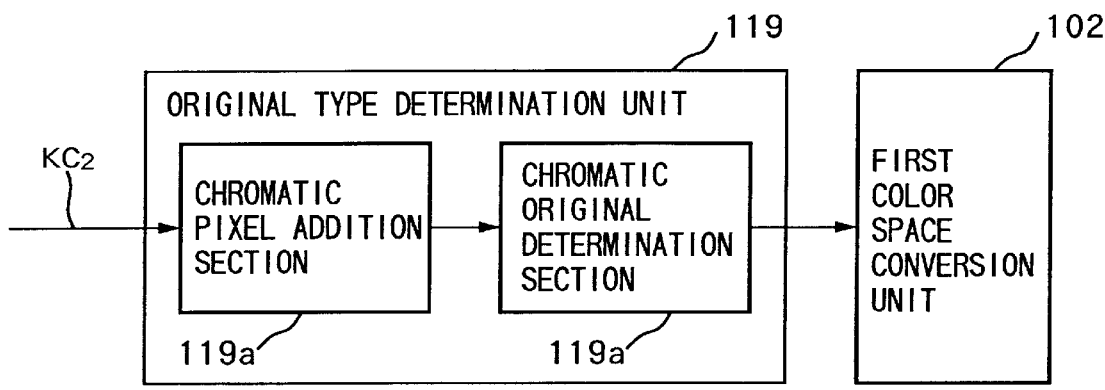
FIG. 19 is a block diagram showing the arrangement of an original type determination unit of the fourth embodiment.

The determination unit 119 has a chromatic pixel addition section 119a for summing up signals KC2 supplied from the second achromatic color/chromatic color determination unit, and a chromatic original determination section 119b for determining based on the sum value if a color original can be finally determined, as shown in FIG. 19.

Figure 20:
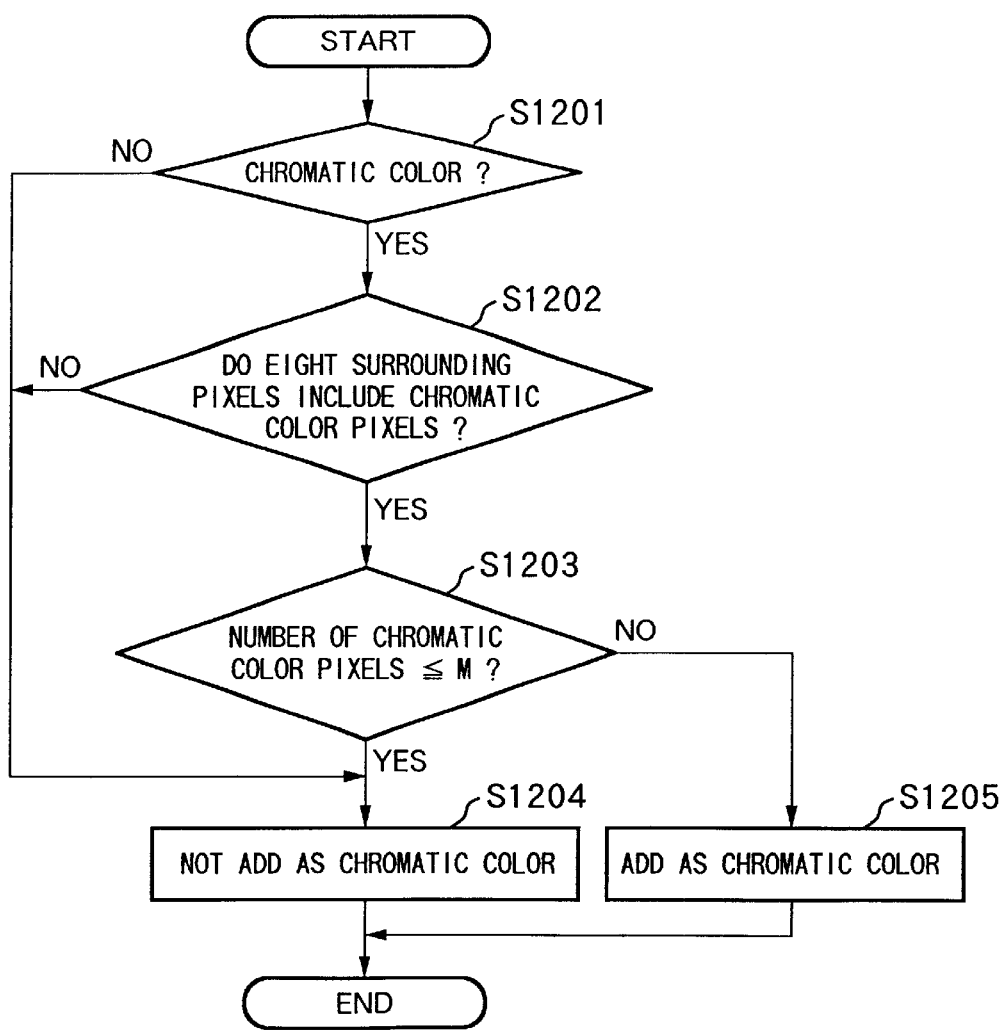
FIG. 20 is a flow chart for explaining the processing in a chromatic pixel addition section in the original type determination unit of the fourth embodiment.

The flow of the processing in the chromatic pixel addition section 119a will be described below with the aid of FIG. 20. Note that this processing progresses in turn in the main scanning direction. Assume that a signal determined to be a chromatic color of signals KC2 from the second achromatic color/chromatic color determination unit 118 is input (step S1201). The determination signal KC2 corresponding to the pixel of interest may be directly transferred to the chromatic original determination section 119b, but it is very hard to perfectly suppress determination errors owing to pixel shift in the second achromatic color/chromatic color determination unit 118. Hence, in the fourth embodiment, determination signals of pixels around the pixel of interest determined to be a chromatic color pixel are checked (step S1202).

Since pixels around the pixel of interest must be referred to, the chromatic pixel addition section 119a comprises a buffer memory for storing signals KC2 (signals indicating a chromatic color or achromatic color) for several lines output from the second achromatic color/chromatic color determination unit 118.

The number of pixels similarly determined to be chromatic color pixels included in eight surrounding pixels around the pixel of interest determined to be a chromatic color pixel is checked. At this time, if the number of surrounding pixels determined to be chromatic color pixels is equal to or smaller than a predetermined number M ($\geq 0$) of pixels (step S1203), the flow advances to step S1204, and the chromatic color pixel of interest is not determined to be a chromatic color pixel and is not added (not counted up).

On the other hand, if it is determined in step S1203 that the number of chromatic color pixels around the pixel of interest is larger than M (the number of chromatic color pixels >M), the pixel of interest is determined to be a chromatic color pixel and is added (counted up) (step S1205).

The chromatic color pixel addition section 119a executes the above-mentioned processing in units of lines, and every time the addition section 119a obtains the number of chromatic color pixels per line, it outputs the count result to the chromatic original determination section 119b.

In order to execute the above-mentioned processing, i.e., processing for determining based on surrounding pixels around the pixel of interest (two-dimensional space), memories for three lines (in practice, memories for two lines and latches for two pixels) are required. Alternatively, the neighboring pixel in the main scanning direction may be referred to, and only when the neighboring pixel is a chromatic color pixel, the pixel of interest may be determined to be a chromatic color pixel.

In this case, checking in the main scanning direction alone often may not allow determination in consideration of information as to whether or not color shift is likely to occur in the vicinity of the pixel of interest, for example, when the pixel of interest is present in the vicinity of the edge of a horizontal black line. Hence, determination is preferably made based on the two-dimensional space. Even if an original includes a horizontal line, the horizontal line is rarely read as a true horizontal line (i.e., the horizontal line is normally read as a slanted line the slope of which cannot be visually recognized), and even if determination errors are produced at that portion, they have small influences on the total sum result. Despite of such disadvantages, the memory capacity required can be reduced.

Figure 21:
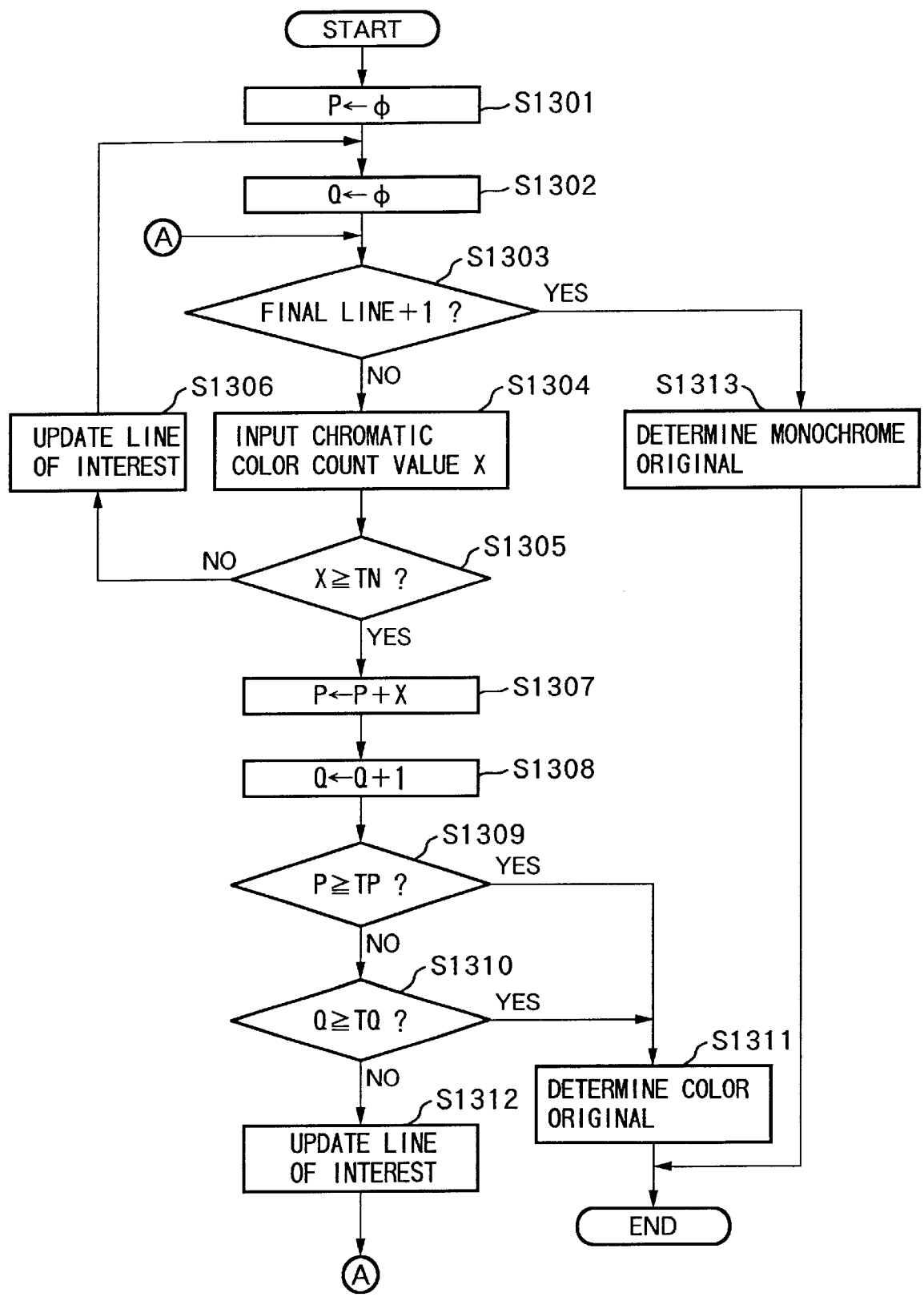
FIG. 21 is a flow chart showing the processing contents in the chromatic pixel addition section in the original type determination unit of the fourth embodiment.

Subsequently, the chromatic original determination section 119b in the original type determination unit 119 will be explained below. The chromatic original determination section 119b of this embodiment uses the determination result from the chromatic pixel addition section 119a in units of main scanning lines. FIG. 21 shows the flow of the processing of the determination section 119b.

In the following description, X represents the output value from the chromatic pixel addition section 119a, P and Q represent variables, and TN, TP, and TQ represent predetermined slice levels. The meanings of these variables will become apparent from the following descriptions.

In steps S1301 and S1302, the variables P and Q are initialized to "0 (zero)". The flow advances to step S1303 to check if the processing has ended. The reason why FIG. 21 describes "final line+1?" is to check if the final line has been exceeded, and to include determination processing for the final line.

If NO in step S1303, the flow advances to step S1304 to receive the determination result X from the chromatic pixel addition section 119a of the line of interest (the first main scanning line of the original image in the first processing).

In step S1305, the determination result X is compared with the slice level TN (the value TN is set at "1" in this embodiment, but preferably assumes a value depending on the environment such as the reading resolution and the like) to check if X≧TN.

If it is determined in step S1305 that X<TN, the flow advances to step S1306 to update the line of interest to the next line, and the flow returns to step S1302. As a result, if the count value X of chromatic color pixels in the line of interest is smaller than TN, the variable Q is always cleared to "0".

If it is determined that the number X of chromatic color pixels in the line of interest is equal to or larger than the slice level TN, a total of chromatic color pixels in the lines checked so far is stored in the variable P in step S1307. The flow then advances to step S1308 to increment the variable Q by "1". That is, the variable Q stores the number of successive lines each having the number of chromatic color pixels equal to or larger than TN.

The flow advances to step S1309 to check if the value of the variable P is equal to or larger than the slice level TP. If it is determined that P≧TP, the flow advances to step S1311 to determine that the original of interest is a color original.

On the other hand, if it is determined that P<TP, the flow advances to step S1310 and Q is compared with the slice level TQ to check if Q≧TQ, i.e., if the number of successive lines having the effective number of chromatic pixels is equal to or larger than TQ. If it is determined that Q≧TQ, it is also determined that the original of interest is a color original (step S1311), thus ending this processing. On the other hand, if it is determined that Q<TQ, the line of interest is updated to the next line in step S1312, and the flow returns to step S1303. Hence, if it is determined in step S1305 that the count value in the main scanning direction is smaller than the predetermined value, Q is cleared to "0" again.

During the course of the above-mentioned processing, if it is determined that the line of interest is the final line +1, it is determined that the original of interest is a monochrome original (step S1313), thus ending this processing.

The above-mentioned processing can be summarized as follows.

When the number of successive lines each having the number of chromatic color pixels equal to or larger than TN is equal to or larger than TQ, it is determined that the original of interest is a color original. Also, when lines each having the number of chromatic color pixels equal to or larger than TN are present, and the total of chromatic color pixels in all the lines which satisfy that condition is equal to or larger than the slice level TP, it is determined that the original of interest is a color original.

Thereafter, if it is determined that the original is a color original, copying previously described in this embodiment is done. On the other hand, if it is determined that the original is a monochrome original, substantially the same copying processing as in the color original except that the first color space conversion unit 102 sets the saturation component at zero, i.e., processing using the K component alone, is executed.

As described above, according to the fourth embodiment, the second achromatic color/chromatic color determination unit 118 refers to not only the pixel of interest but also signals TI and KC of its surrounding pixels on the basis of the signals KC from the first achromatic color/chromatic color determination unit 115' and the signals TI from the character/halftone image determination unit 111 so as to further improve reliability in achromatic color/chromatic color determination, and the original type determination unit 119 finally checks the determination result of the unit 118. As a consequence, determination errors indicating a color original owing to "color misregistration" can be minimized.

In the processing of the original type determination unit 119 in the above description, the total P of chromatic color pixels in lines having the effective number of chromatic color pixels is compared with the slice level TP. For example, if originals having similar image layouts have different original sizes, they assume different total values P. Hence, if the apparatus in question reads originals having a plurality of different sizes, the slice level TP is preferably varied in correspondence with the original size.

(Fifth Embodiment)

The fifth embodiment according to the present invention will be explained below. A block diagram that depicts the basic arrangement is the same as that of the fourth embodiment. Hence, a description of the arrangement will be omitted to avoid repetitive descriptions with the fourth embodiment.

In the description of the fifth embodiment, a second achromatic color/chromatic color determination unit 118 will be explained.

Figure 22:
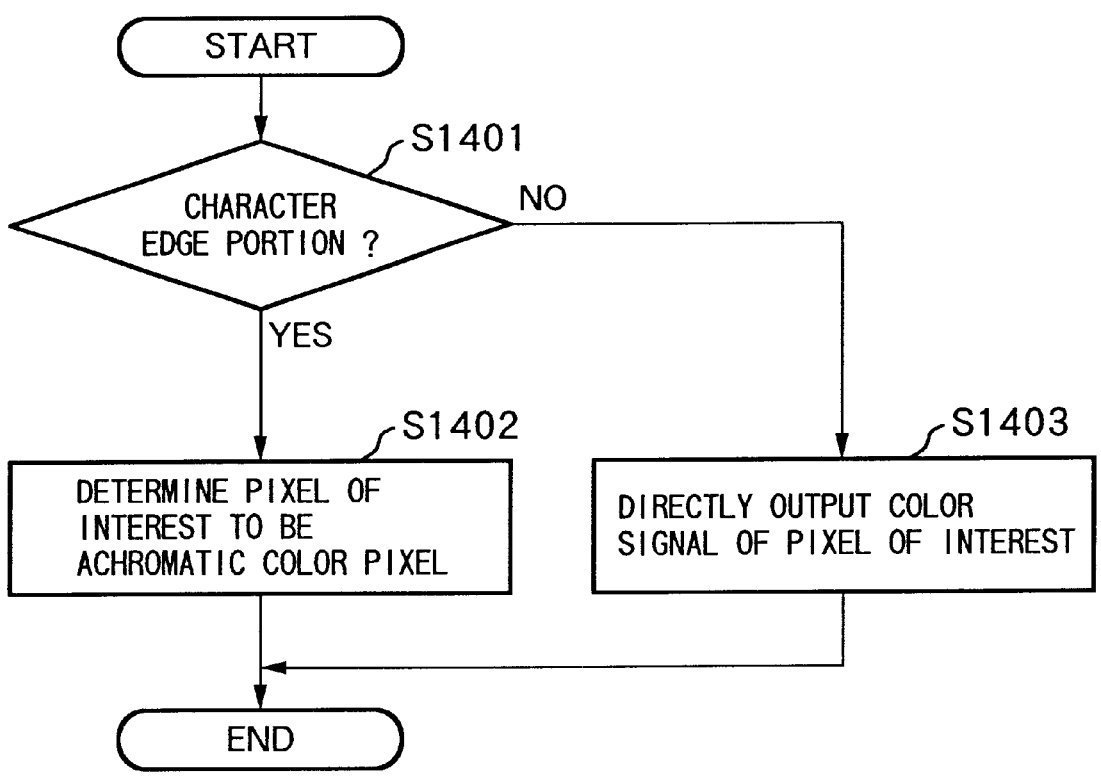
FIG. 22 is a flow chart for explaining determination in a second achromatic color/chromatic color determination unit according to the fifth embodiment of the present invention.

The flow of the processing in the second achromatic color/chromatic color determination unit 118 in the fifth embodiment will be described below with reference to FIG. 22.

It is checked based on a signal TI from a character/halftone image determination unit 111 if the pixel of interest corresponds to an edge portion of a character (step S1401). If YES in step S1401, the second achromatic color/chromatic color determination unit unconditionally determines that the color of the pixel of interest is an achromatic color, and outputs this determination result to an original type determination unit 119 (step S1402). On the other hand, if it is determined that the pixel of interest corresponds to a halftone image portion, the second achromatic color/chromatic color determination unit directly outputs a signal KC from a first achromatic color/chromatic color determination unit 115 to the original type determination unit 119 (step S1403).

The subsequent processing is the same as that in the fourth embodiment. The fifth embodiment assumes a case wherein the character/halftone image determination unit 111 that executes pre-processing of the apparatus outputs signals 1501 to 1503 (see FIGS. 23A and 23B) which are thickened by one or a plurality of extra pixels as a character determination portion in consideration of pixel shift of the scanner.

Figure 23A:
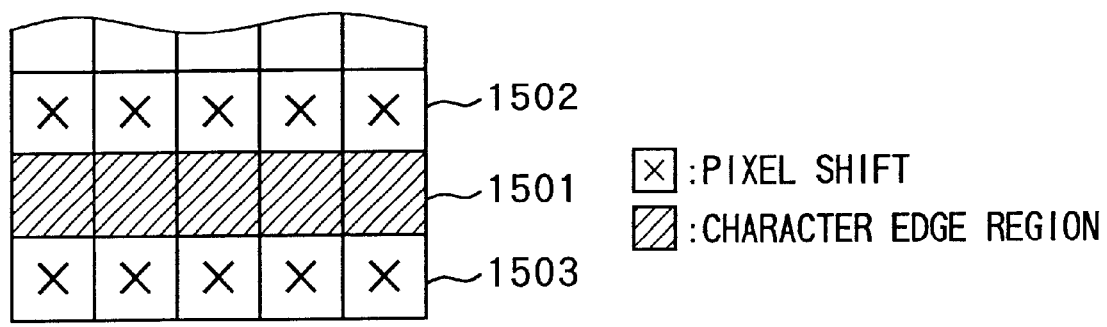
FIGS. 23A and 23B are schematic views showing the principle of thickening processing of a character/halftone image determination signal used in the second achromatic color/chromatic color determination unit of the fifth embodiment.
Figure 23B:
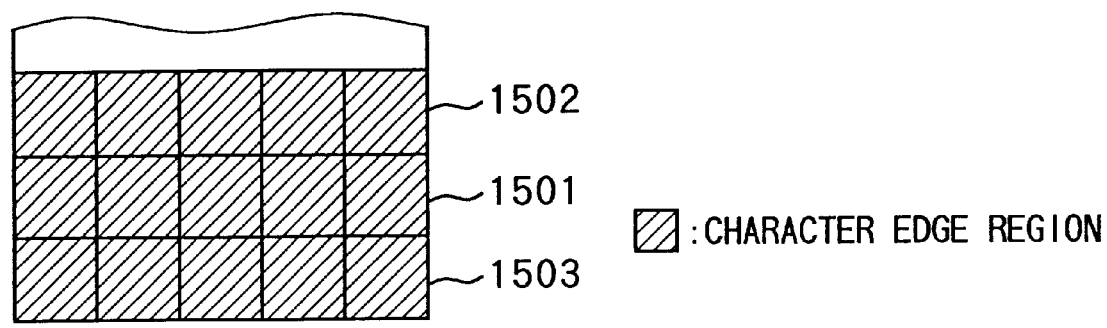

FIG. 23A shows the output results of conventional character/ halftone image determination signals. In FIG. 23A, reference numerals 1502 and 1503 denote pixel shift regions; and 1501, a character edge region. In FIG. 23B, the character edge region is thickened in consideration of the pixel shift regions. That is, the pixel shift portion adjacent to the character edge portion is also determined as a character signal portion (in the fifth embodiment, the character edge portion is thickened in the sub-scanning direction alone). In this case, original color detection is done while ignoring color determination signals at the pixel shift positions. Of course, the character edge portion may be thickened also in the main scanning direction, and color determination may be made on the basis of an n×m region.

Figure 24:
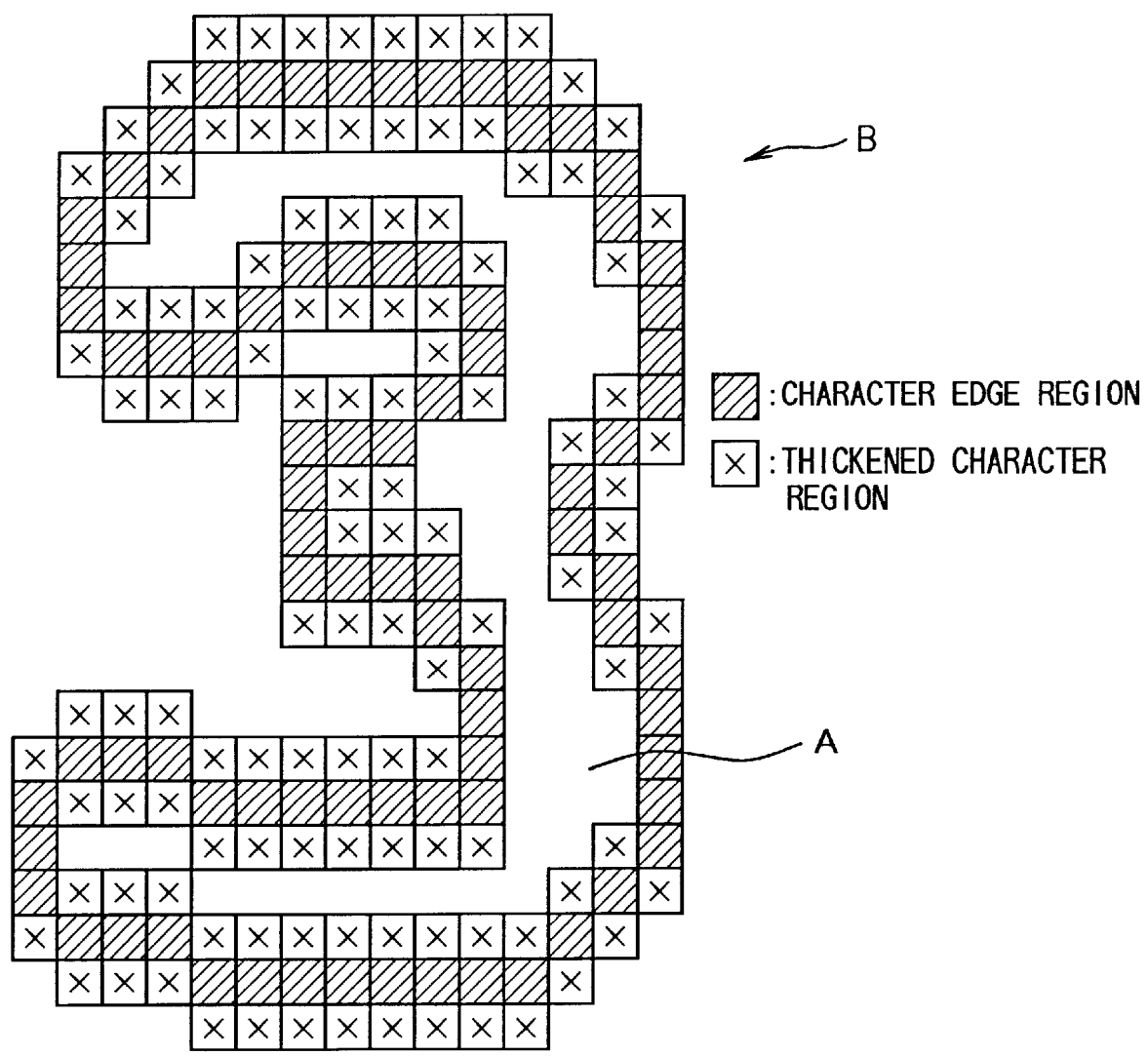
FIG. 24 shows an example of the principle explained with the aid of FIGS. 23A and 23B.

According to the fifth embodiment, as shown in FIG. 24 (that takes a character image "3" as an example), the hatched portions in FIG. 24 indicate original character edge regions, and the pixels with marks x represent thickened character edge determination regions in consideration of pixel shift regions. Hence, the second achromatic color/chromatic color determination unit 118 in the fifth embodiment outputs determination results of an internal pixel region A and outside region B in FIG. 24 as determination data to the original type determination unit 119. In this embodiment, character regions are thickened, but the same processing may be made in a system that does not thicken character regions.

As described above, according to the fifth embodiment as well, original determination can be made in consideration of "color misregistration".

Hence, according to the fourth and fifth embodiments of the present invention, determination errors of monochrome originals due to pixel shift that poses a problem in a conventional color original determination device can be eliminated. Especially, according to the above embodiment, the processing for suppressing the influences of pixel shift is done in two stages, i.e., the second achromatic color/ chromatic color determination unit and the original type determination unit. Hence, the apparatus of this embodiment can prolong the service life of the drum (especially, a single-drum system) of a color image processing apparatus, mainly, a color copying machine, and can reduce the consumption amount of toner, thus providing a copying machine with low running cost.

(Sixth Embodiment)

In the fourth and fifth embodiments, if it is determined that the line of interest (main scanning line) includes chromatic color pixels more than a predetermined value, the line of interest is determined to be a chromatic color line, and the continuity of such lines is counted in the sub-scanning direction.

Figure 25:
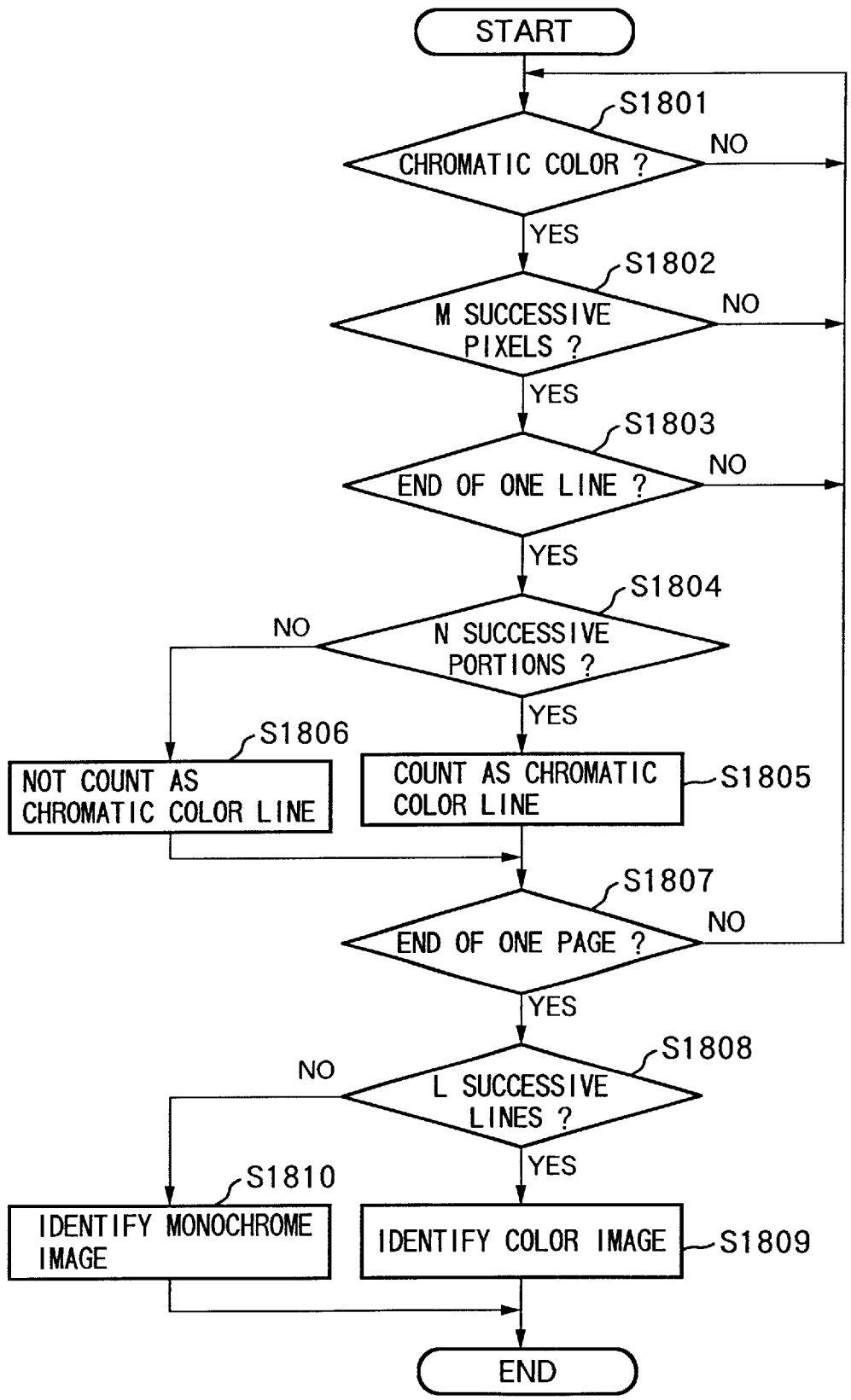
FIG. 25 is a flow chart showing the contents of the achromatic color/chromatic color determination processing according to the sixth embodiment of the present invention.

However, color misregistration is likely to be produced next to a black vertical line or a portion (vertical line) of a large black character due to pixel shift in the main scanning direction. In view of this problem, in the sixth embodiment, as shown in FIG. 25, if M ($\geq$2) chromatic color pixels are successively present in the main scanning direction, and such successive pixels appear in the line of interest at N ($\geq$2) or more positions, the line of interest is determined to be a chromatic color line (steps S1801 to S1806). If L (>2) chromatic color lines successively appear, the original image of interest is determined to be a color image (steps S1807 to S1810).

When the continuity of chromatic color pixels is two-dimensionally considered, discrimination errors from a color image can be eliminated independently of color misregistration.

As described above, according to the third to sixth embodiments, even when color misregistration has taken place, whether the input image is a color image or monochrome image can be satisfactorily discriminated.

(Seventh Embodiment)

The seventh embodiment will be described below. The seventh embodiment is directed to accurate determination as to whether an original is a color original or monochrome original as in the fourth to sixth embodiments described above.

Figure 26:
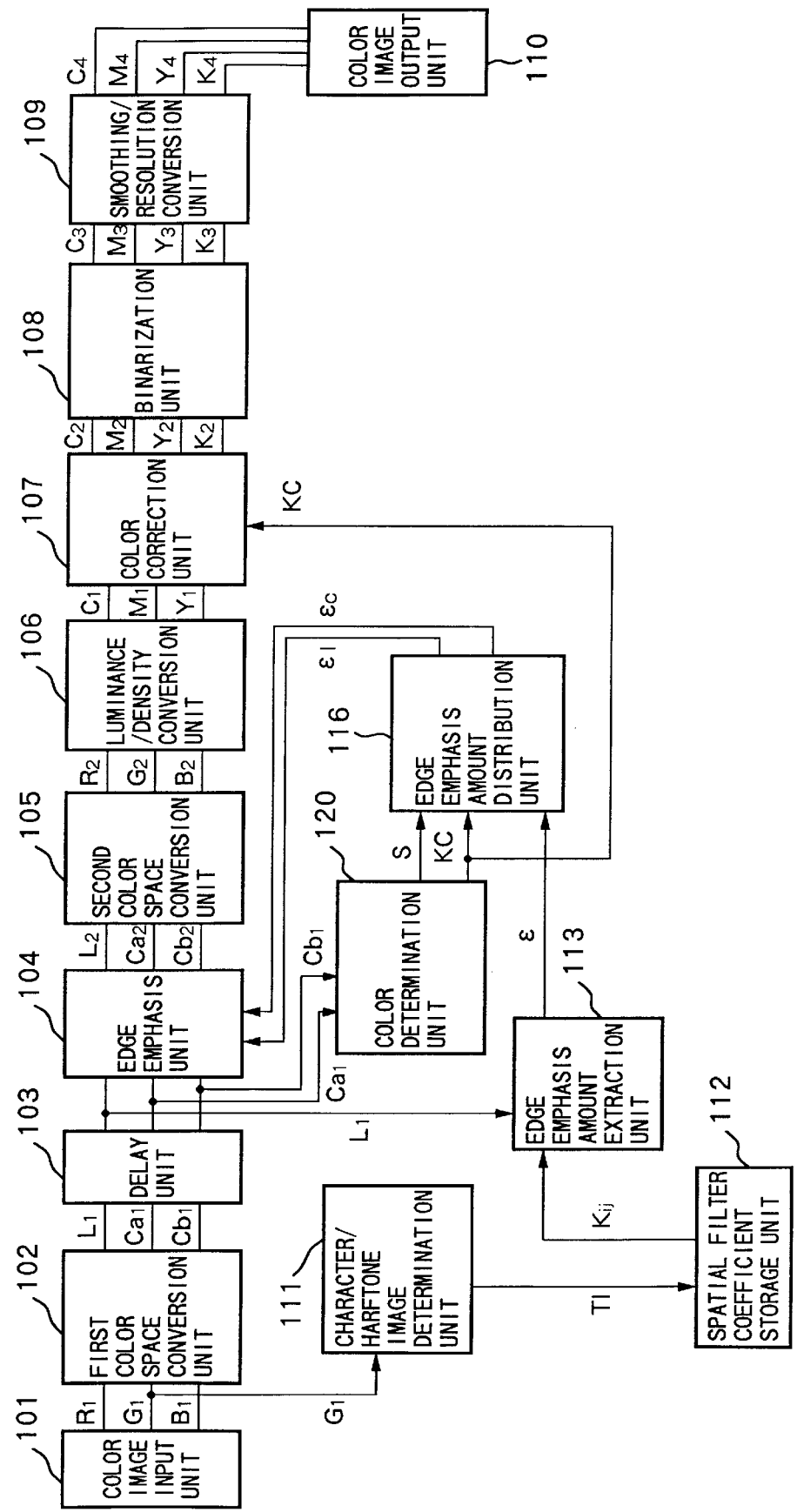
FIG. 26 is a block diagram showing the arrangement of an apparatus according to the seventh embodiment of the present invention.

FIG. 26 is a block diagram of an image processing unit 209 (see FIG. 15) in the seventh embodiment.

Note that constituting elements 101 to 110 execute the same processing as the units denoted by the same reference numerals in the individual embodiments described above. Also, some of units denoted by reference numerals 111 to 120 are the same as those in the above embodiments.

Although some descriptions may overlap previous ones, the individual constituting elements will be explained in turn for easy understanding of the operation of the seventh embodiment.

Three color-separated signals R1, G1, and B1 of an input color image are converted into a lightness signal L1 and chromaticity signals (Ca1, Cb1) indicating a color tone (other color spaces, such as L*a*b* and L*u*v* color spaces may be used).

Equations (1) described in the first embodiment can be used as conversion formulas for converting three color-separated signals R, G, and B into lightness and chromaticity signals L1, Ca1, and Cb1 by a simple method.

Upon determining an achromatic color/chromatic color, a saturation value S is determined using equation (2) described previously using values Ca1 and Cb1 in units of pixels, which are synchronized with the center pixel of lightness signals L1.

Using a predetermined slice level $\rho$, an achromatic color/ chromatic color is determined as follows:

(When $S<\rho$) KC=achromatic color (When $\rho \leq S$) KC=chromatic color

However, when determination is made pixel by pixel in this manner, if noise is mixed on signals input from the scanner unit or if color misregistration has occurred under the influence of vibrations or the like of the scanner, it disturbs accurate color determination.

In view of this problem, in the seventh embodiment, a memory for delaying data is used for storing a plurality of pixel values, and the stored values are used in determination, thereby eliminating the influences of noise and color misregistration and attaining color determination with higher precision.

Figure 27:
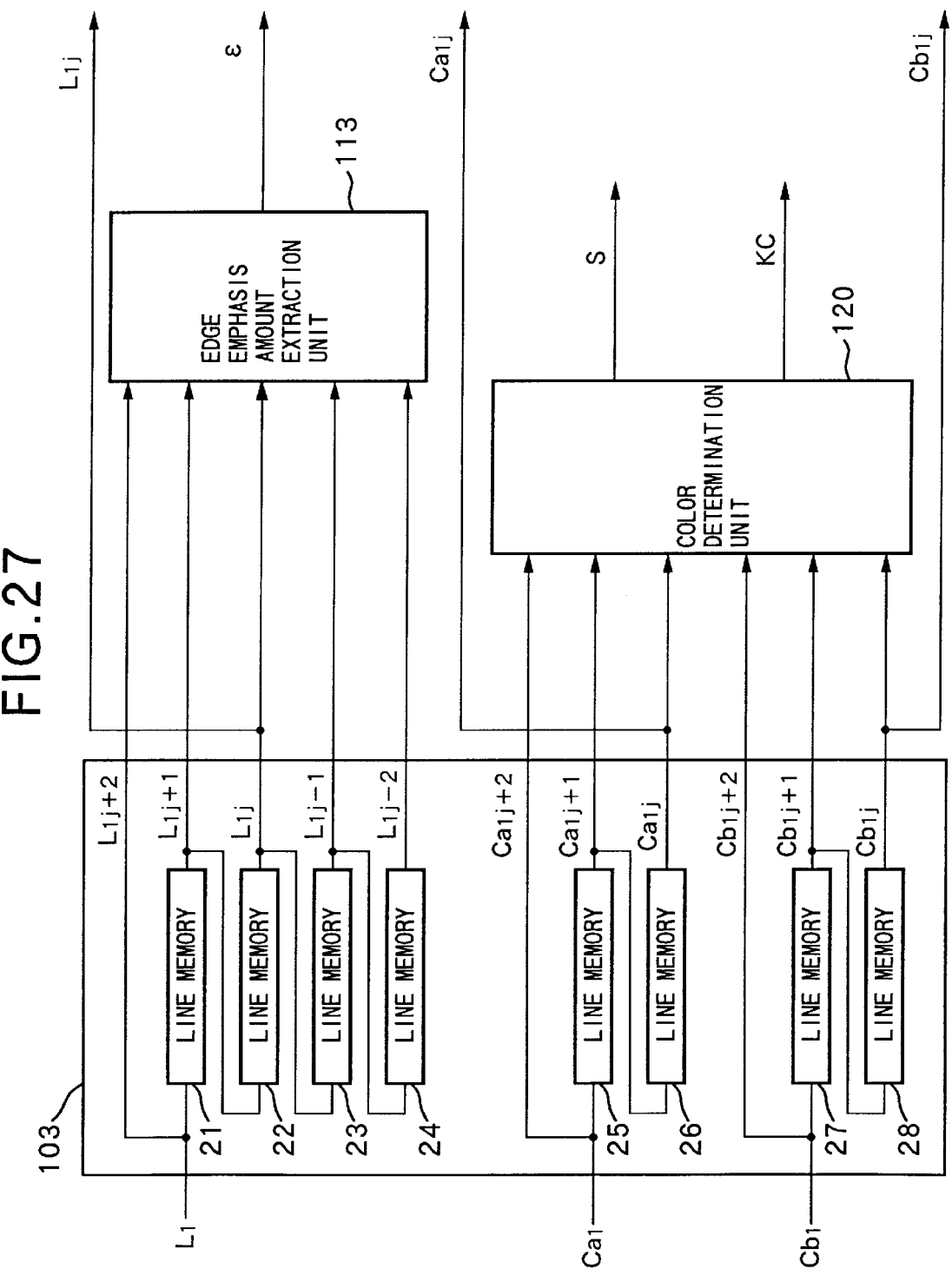
FIG. 27 is a block diagram showing the arrangement around a delay unit 103B in FIG. 26.

FIG. 26 is a block diagram showing principal part of image processing in the seventh embodiment, and FIG. 27 is a block diagram showing a delay unit 103 in FIG. 26 in detail. Note that the delay unit 103 in the first to sixth embodiments has the same arrangement as that shown in FIG. 27.

Reference numeral 101 denotes a color image input unit for inputting an original image as color data. The color image input unit 101 serves as an original image reading device such as a color image scanner or the like. However, the present invention is not limited to such specific device, and the image input unit 101 includes an image input unit from a computer in a broad sense. Hence, a device for inputting an image stored in a storage medium such as a magnetooptical disk or the like may be used. The color image input unit 101 outputs three color-separated signals R1, G1, and B1 which are obtained by color-separating each pixel of a color image into R, G, and B components.

The signal G1 (takes on a value closest to the luminance signal among the three components) as one of the three color-separated signals R1, G1, and B1 is input to a character/halftone image determination unit 111, which determines if the pixel of interest corresponds to a line image such as a character or a thin line or a continuous-gradation image (halftone image) such as a picture image or a printed image, and outputs a character/halftone image determination signal TI. A spatial filter coefficient storage unit 112 receives the character/halftone image determination signal TI. When the pixel of interest corresponds to a character signal, the unit 112 selects character spatial filter coefficients 201 shown in FIG. 2; when the pixel of interest corresponds to a halftone image, the unit 112 selects image spatial filter coefficients 202 shown in FIG. 2, and outputs the selected character or image spatial filter coefficients Kij to an edge emphasis amount extraction unit 113.

On the other hand, the three color-separated signals Ri, G1, and B1 of the input color image are input to a first color space conversion unit 102, and are converted into a lightness signal L1 representing lightness and chromaticity signals (Ca1, Cb1) representing color tones (note that other color spaces, such as L*a*b* and L*u*v* color spaces may be used, as described above).

The lightness signal L1 and chromaticity signals (Ca1, Cb1) output from the first color space conversion unit 102 are input to the delay unit 103, in which line memories 21 to 24 store lightness signals L1 for four lines, and line memories 25 and 26 store chromaticity signals Ca1 for two lines and line memories 27 and 28 store chromaticity signals Cb1 for two lines so as to be synchronized with the center pixel of lightness signals. Assuming that line j represents the central line, lightness signals for lines j−2, j−1, j, and j+1 are stored, and lightness signals for five lines including the current line j+2 are output.

On the other hand, as for the chromaticity signal Ca1, the line memories 25 and 26 of the delay unit 103 store signals for lines j and j+1, and chromaticity signals Ca1 for three lines including the current line j+2 are output. Similarly, as for the chromaticity signal Cb1, signals for lines j and j+1 are stored, and chromaticity signals Cb1 for three lines including the current line j+2 are output.

In this embodiment, upon calculation of a saturation signal S and an achromatic color/chromatic color determination signal KC, spatial processing is done using data for three lines, i.e., lines j, j+1, and j+2.

Figure 28:
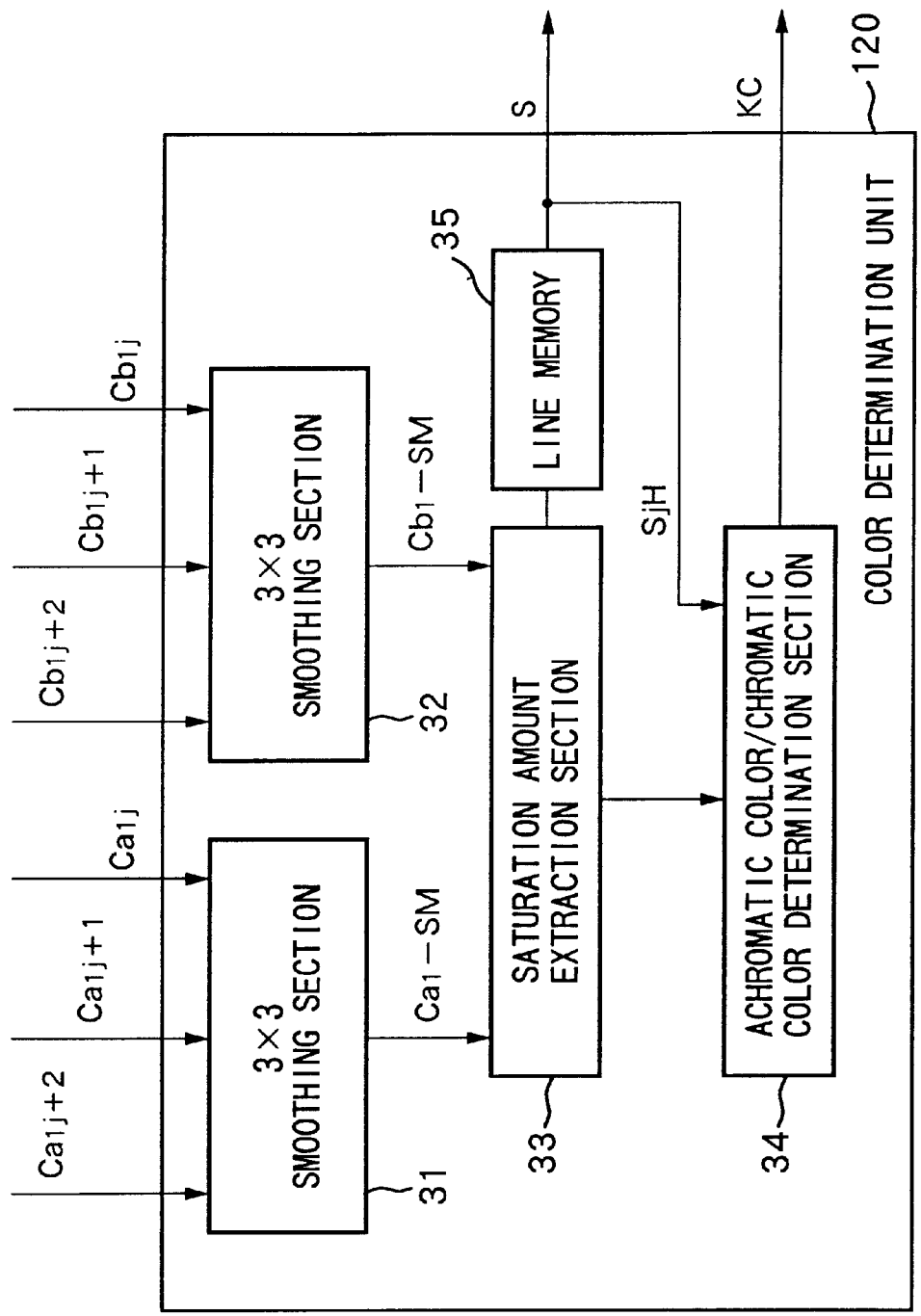
FIG. 28 is a block diagram showing the arrangement of a color determination unit 120 in the seventh embodiment.

FIG. 28 is a block diagram of a color determination unit 120 of the seventh embodiment. In FIG. 28, reference numerals 31 and 32 denote 3×3 integral sections (smoothing sections), which perform weighted mean calculations in accordance with predetermined coefficients, and output mean values Ca1_SM and Cb1_SM of the pixel of interest.

FIG. 29 shows an example of coefficients for the above weighted mean calculations. That is, according to the coefficients shown in FIG. 29, Ca1_SM and Cb1_SM at the position of the pixel of interest literally yield mean values.

Reference numeral 33 denotes a saturation determination section, which determines a saturation amount S on the basis of the weighted mean values Ca1_SM and Cb1_SM, and outputs the amount S to an edge emphasis amount distribution unit 116. In the seventh embodiment, the saturation value S is calculated as follows in the same manner as in the above description:

$$Sj+1=(Ca1\_SM^2+Cb1\_SM^2)^{0.5}$$

Note that the value Sj+1 is delayed by one line by a line memory 35, and a saturation amount Sj for line j is output as the saturation signal S.

Reference numeral 34 denotes an achromatic color/ chromatic color determination section, which receives the signal value S, and determines an achromatic color/ chromatic color in accordance with the following relations using a predetermined slice level ρ, thus outputting an achromatic signal/chromatic signal determination signal KC:

(When $S<\rho$) KC=achromatic color (When $\rho \leq S$) KC=chromatic color

The edge emphasis amount distribution unit 116 receives an edge emphasis amount ϵ, the saturation signal S, and the achromatic color/chromatic color determination signal KC, generates an edge emphasis correction amount ϵl for the lightness signal L1 and an edge emphasis correction amount ϵc for the chromaticity signals (Ca1, Cb1) in accordance with the values of the input signals, and supplies them to an edge emphasis unit 104.

The edge emphasis correction amount ϵl for the lightness signal L1 will be described below. Basically, as the saturation signal S has a smaller value (closer to an achromatic color), a larger edge emphasis amount ϵ is distributed to the lightness signal. For an achromatic color signal pixel (KC=0), a full edge emphasis amount ϵ is assigned to ϵl.

The edge emphasis correction amount ϵc for the chromaticity signals (Ca1, Cb1) will be described below. As for the chromaticity signals, basically, contrary to the correction amount for the lightness signal, as the saturation signal S has a larger value (more vivid color), a larger edge emphasis amount ϵ is distributed to each chromaticity signal. For an achromatic color signal pixel (KC=0), no edge correction is done, and chromaticity signals of the pixel of interest are removed. This is because, in an image processing apparatus such as a color copying machine, residual color components in copied images such as black characters or the like result in visually very poor image quality. Hence, such pixels must be color-corrected to completely achromatic color signals by cutting their chromatic components.

Note that the values ϵl and ϵc are calculated in the same manner as in the first embodiment.

The generated edge emphasis correction amounts ϵl and ϵc are supplied to the edge emphasis unit 104 together with the signals L, Ca, and Cb. The edge emphasis unit 104 adds the edge emphasis correction amount ϵl to the lightness signal L, and multiplies the chromaticity signals Ca and Cb by the edge emphasis correction amount ϵc. This processing is the same as equations (8) mentioned previously, and is realized as follows:

$$L2=\epsilon l+L1$$

$$Ca2=\epsilon c*Ca1$$

$$Cb2=\epsilon c*Cb1$$

As can be seen from the above equations, by adding the edge correction amount ϵl to the signal L, lightness can be preserved in a pixel (ϵl=0) which has high saturation and in which lightness is not to be edge-emphasized.

On the other hand, since the signals Ca and Cb are multiplied by the edge correction amount ϵc, a pixel which has low saturation and is determined to be an achromatic color is multiplied by ϵc=0, and the chromaticity components themselves of the pixel of interest can be removed.

The edge-emphasized signals L2, Ca2, and Cb2 generated by the edge emphasis unit 104 are output to a second color space conversion unit 105, and are inversely converted into R, G, and B signals again.

Equations (10) below are an example of conversion formulas for converting the lightness and chromaticity signals L2, Ca2, and Cb2 into three color-separated signals R2, G2, and B2, and are inverse conversions of equations (1) above:

$$R=(4\times L+5\times Ca+2\times Cb)/4$$

$$G=(4\times L-3\times Ca+2\times Cb)/4$$

$$B=(4\times L+Ca-6\times Cb)/4 \tag{10}$$

The three color-separated signals inversely converted into R, G, and B signals are supplied to a luminance/density conversion unit 106, which converts three color-separated signals R2, G2, and B2 into density signals C1, M1, and Y1 by, e.g., log conversion.

The density signals C1, M1, and Y1 are supplied to a color correction unit 107, and are subjected to color processing such as generation of a black signal K, undercolor removal, color correction, and the like, thus outputting density signals C2, M2, Y2, and K2. Also, when the determination signal KC as the determination result of the achromatic color/chromatic color determination unit 115 indicates that the pixel of interest is an achromatic color pixel, the color correction unit 107 sets the density signals C2, M2, and Y2 at C2=M2=Y2=0 to convert the pixel of interest into one defined by black color alone.

Reference numeral 110 denotes a color image output unit which comprises an image recording apparatus such as an electrophotographic or ink-jet printer.

When the color image output unit is, e.g., a binary printer, the density signals C2, M2, Y2, and K2 are converted into binary pixel signals C3, M3, Y3, and K3 by a binarization unit 108. As binarization methods, various methods such as an error diffusion method, dither method, and the like are available, and binarization is attained by a scheme suitable for each apparatus.

On the other hand, when the resolution of the image input from the color image input unit 101 is different from that of the image output from the color image output unit 110, the binary pixel signals C3, M3, Y3, and K3 are subjected to resolution conversion processing by a smoothing/resolution conversion unit 109 to be converted into signals C4, M4, Y4, and K4. Especially, when the resolution of the color image output unit 110 is higher than that of the color image input unit 101, smoothing processing for smoothly interpolating edge portions of the image is performed, and the processing result is printed by the color image output unit 110.

As color determination is made by the above-mentioned method, one-shot noise components hardly influence the color determination result after integration. Also, since chromatic colors around a black character produced by color misregistration are subjected to integral processing together with white as undercolor and black of a black character, their saturation values lower, and such chromatic colors can be determined to be an achromatic color.

With this processing, the influences of noise and color misregistration can be suppressed, and accurate color determination can be performed.

The output signal TI from the character/halftone image determination unit 111 is input to the color correction unit 107, and only when the signal KC indicates an achromatic color and the signal TI indicates a character image based on a signal, the output of the corresponding pixel is controlled to be single K color, thus outputting only an achromatic color character pixel using K color alone.

Furthermore, in a region other than character pixels, normal color correction processing is done, and a continuous gradation portion is subjected to color reproduction by mixing C, M, Y, and K, thus reproducing natural colors.

(Eighth Embodiment)

In the seventh embodiment described above, using values Ca1 and Cb1 in units of pixels, which are synchronized with the central pixel of lightness signals L1, the saturation value S is given by:

$$S=(Ca1^2+Cb1^2)^{0.5}$$

Using the predetermined slice level ρ, an achromatic color/chromatic color is given by:

(When $S<\rho$) KC=achromatic color (When $\rho \leq S$) KC=chromatic color

However, when determination is made in this manner, since the achromatic color/chromatic color determination slice level remains the same independently of the color tones, the slice level cannot be changed in correspondence with colors (blue or green in practice) which are likely to produce determination errors, and colors which hardly produce determination errors. When the slice level is determined in correspondence with the colors which hardly produce determination errors, determination errors occur for blue and green, and such colors are converted into an achromatic color. On the other hand, when the slice level is determined in correspondence with the colors which are likely to produce determination errors, determination errors occur for a black or gray portion or a color misregistration portion, and such portion is determined to be a chromatic color.

Also, since a dark color has a small saturation value, if the same slice level as that for a light color is used for such dark color, a chromatic color is likely to be determined as an achromatic color.

In the eighth embodiment, a color determination unit 130 (see FIG. 30) is prepared by combining a saturation extraction unit and an achromatic color/chromatic color determination unit. The color determination unit 130 receives input values L1, Ca1, and Cb1, and attains color determination with higher precision by changing the achromatic color/chromatic color determination slice level in correspondence with the color tone and density, thus outputting a saturation signal S and an achromatic color/chromatic color determination signal KC.

Figure 30:
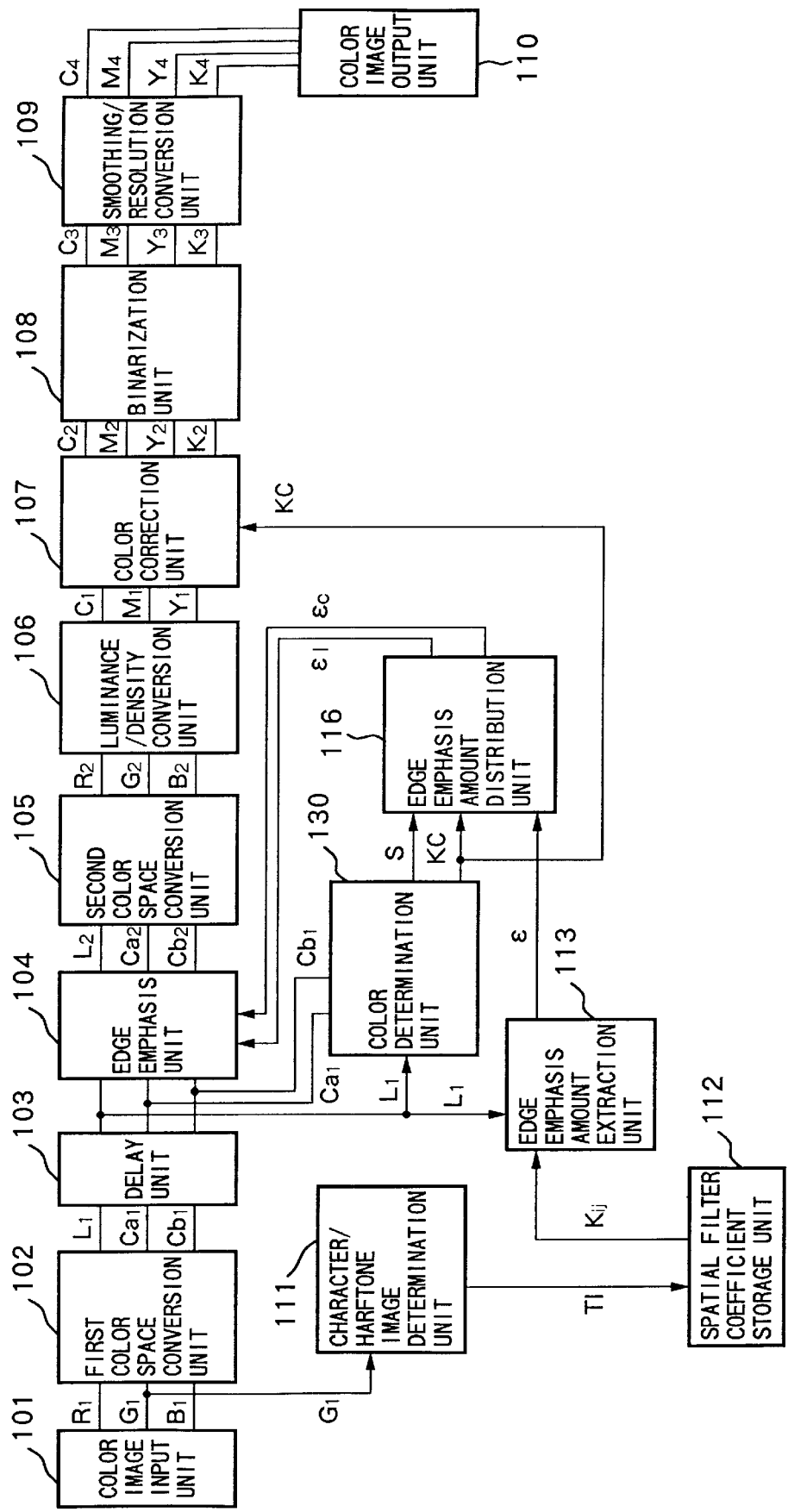
FIG. 30 is a block diagram showing the arrangement of an apparatus according to the eighth embodiment of the present invention.
Figure 31:
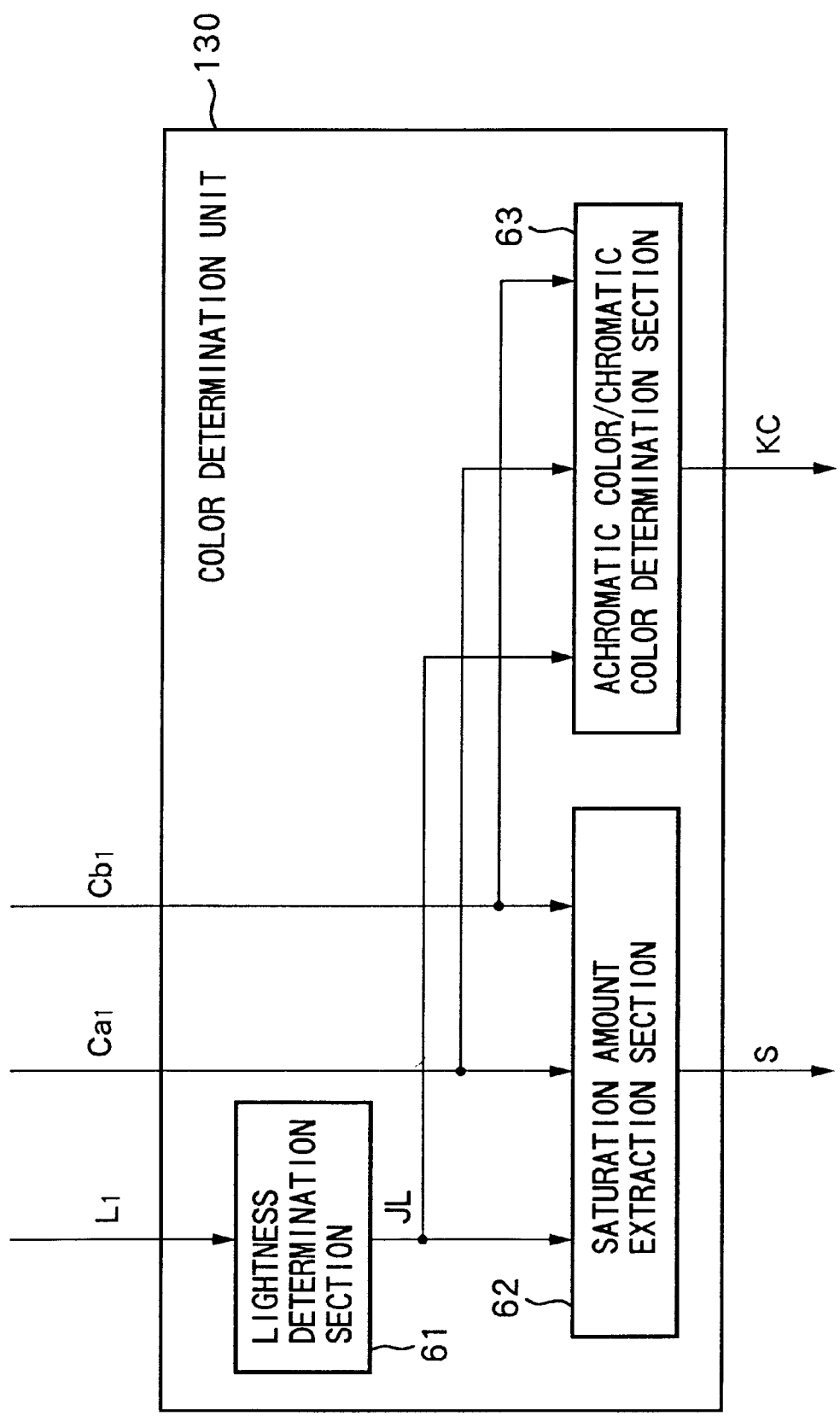
FIG. 31 is a block diagram showing the arrangement of a color determination unit 130 in FIG. 30.

The eighth embodiment will be described in detail below with the aid of FIGS. 30 and 31. Note that FIG. 30 is a block diagram showing the arrangement of an image processing unit 209 of this embodiment, and FIG. 31 is a block diagram showing the arrangement of the color determination unit 130 in detail. Note that the same reference numerals in FIG. 30 denote the same processing units as in FIG. 26, and a detailed description thereof will be omitted.

In FIG. 31, reference numeral 61 denotes a lightness determination section, which outputs a lightness determination signal JL depending on whether or not the value L1 falls within the range defined by predetermined slice levels sl_L1 and sl_L2. That is, When $sl\_L1 < L < sl\_L2$, JL=0

Otherwise, JL=1 (11)

More specifically, JL=1 is output for a portion with lightness equal to or higher than the predetermined slice level (=sl_L2) and a portion with lightness equal to or lower than the predetermined slice level (=sl_L1), and JL=0 is output within the range defined by these slice levels.

The value of this lightness determination signal JL is used for adjusting the slice level serving as an achromatic color/chromatic color determination criterion (to be described later). In relations (11) above, the value of the lightness determination signal is determined in three steps, i.e., high lightness (JL=1), middle lightness (JL=0), and low lightness (JL=1). In order to further improve precision, a larger number of steps may be used. This is because the color space defined by L, Ca, and Cb is expressed by a distorted sphere when Ca and Cb represent orthogonal axes in a two-dimensional plane, and L represents an orthogonal axis perpendicular to the plane.

Reference numeral 62 denotes a saturation amount determination section, which determines a saturation amount S on the basis of the values of the chromaticity signals Ca1 and Cb1, and outputs it to an edge emphasis amount distribution unit. In the eighth embodiment, as in the above description, the saturation amount S is given by:

$$S=(Ca1^2+Cb1^2)^{0.5}$$

Reference numeral 63 denotes an achromatic color/chromatic color determination section, which receives the values JL, Ca, and Cb, and changes the achromatic color/chromatic color determination slice level in accordance with these input values.

In the eighth embodiment, the determination conditions are changed when a stricter color determination condition for blue and green is set or depending on different lightness values.

More specifically, when a stricter color determination condition for blue and green is set, the achromatic color/chromatic color determination section 63 does not use any result from the lightness determination section 61.

Figure 32B:
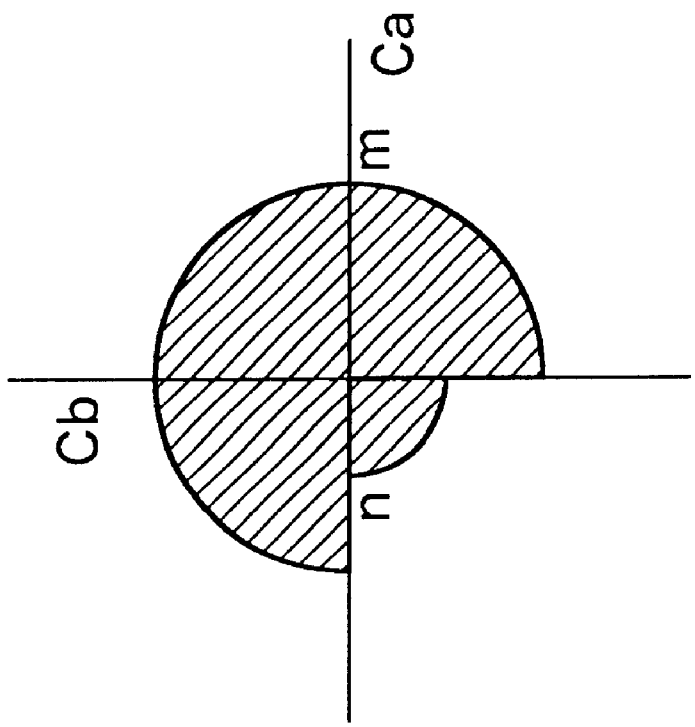
FIGS. 32A and 32B show the effective ranges of slice levels in units of color regions in the eighth embodiment.
Figure 32A:
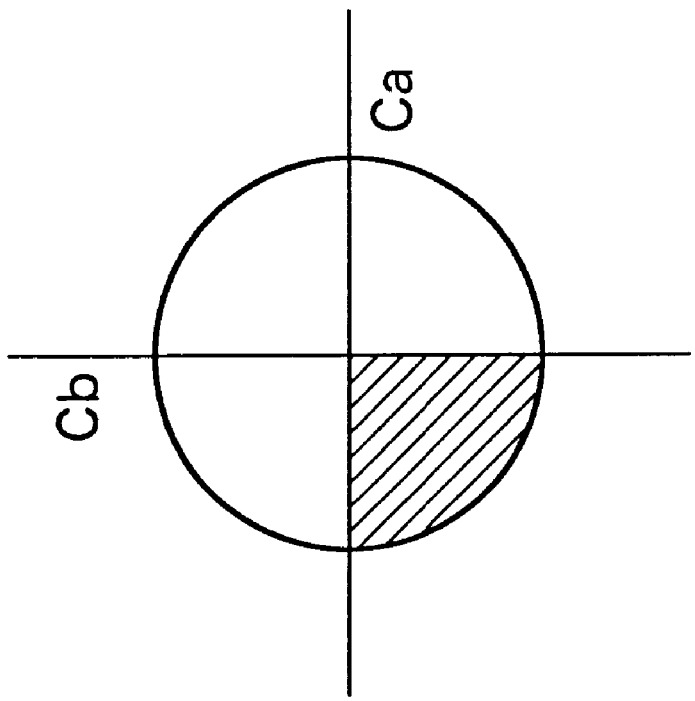

On the color space of Ca and Cb, Ca and Cb components having blue and green color tones correspond to hatched portions in FIG. 32A. For this reason, by setting the following conditions, a stricter color determination condition for blue and green can be set:

If $Ca1 \geq 0$ OR $Cb1 \geq 0$, $sl\_S=m$

If $Ca1 < 0$ AND $Cb1 < 0$, $sl\_S=n$ (12)

(for m>n)

Also, the determination conditions associated with the saturation signal S ($S=(Ca1^2+Cb1^2)^{0.5}$) are changed as given by the following relations (13):

(When $S<sl\_S$) $KC$=achromatic color (When $sl\_S \leq S$) $KC$=chromatic color (13)

In this manner, since an achromatic color/chromatic color is determined in a determination space shown in FIG. 32B (an achromatic color is determined in a hatched portion), a stricter color determination condition can be set for blue and green.

The determination range is changed as follows depending on different lightness values.

In the color space defined by L, Ca, and Cb, as the value L increases from the lowest state, the ranges of Ca and Cb gradually broaden, and when the value L has exceeded a given position, the ranges gradually narrow down. This is because this color space is expressed by a distorted sphere, as described above.

In such color space, if a constant slice level for the saturation amount S is set independently of the value L, the maximum possible values of Ca and Cb become small when the value L is smaller than a given slice level or is larger than another slice level. For this reason, the saturation amount S can no longer exceed the slice level or rarely exceeds the slice level. That is, the corresponding pixel is likely to be erroneously determined as an achromatic color pixel unconditionally.

In view of this problem, in the eighth embodiment, the determination color space of Ca and Cb is changed using the above-mentioned lightness determination signal JL of the lightness L, thereby preventing determination errors in a portion with low lightness or/and a portion with high lightness.

In order to achieve the object of the eighth embodiment, as shown in FIGS. 33A and 33B, the slice level is changed to narrow down the determination region when the lightness L is low (or large), and to broaden the determination region when the lightness L falls within the middle range.

As described above, when slice level sl_L1<lightness L<slice level sl_L2, JL=0 is set; otherwise, i.e., when lightness L<slice level sl_L1 and lightness L>slice level sl_L2, JL=1 is set.

Thus,

When $JL=0$, $sl\_S=m$

When $JL=1$, $sl\_S=n$ (for m>n)

(When $S<sl\_S$) $KC$=achromatic color (When $sl\_S \leq S$) $KC$=chromatic color (14)

In this manner, since the determination spaces shown in FIGS. 33A and 33B are obtained, determination errors of an achromatic color/chromatic color in at least a region with low lightness can be prevented.

In the eighth embodiment, changes in determination color space of Ca and Cb and changes in color space of Ca and Cb in association with L have been independently described. However, since the achromatic color/chromatic color determination section receives L, Ca, and Cb, a determination color space can be formed by combining the above-mentioned two different color spaces. With this color space, color determination can be realized with higher precision.

(Ninth Embodiment)

The ninth embodiment will be described below. As described above, if an achromatic color/chromatic color is uniquely determined in association with the saturation amount S ($=(Ca1^2+Cb1^2)^{0.5}$) calculated using the values Ca1 and Cb1 in units of pixels using the predetermined slice level ρ by relations (4) above, that is:

(When $S<\rho$) $KC$=achromatic color (When $\rho \leq S$) $KC$=chromatic color when an input image is input from, e.g., a scanner, noise mixed on that signal or color misregistration caused by vibrations or the like of the scanner disturbs accurate color determination.

In order to solve this problem, in the ninth embodiment, a plurality of pixel values are integrated using a data delay memory, and the integrated value is used in determination, thereby eliminating the influences of noise and color misregistration and attaining color determination with higher precision. In this manner, the influences of noise and color misregistration can be suppressed, and color determination can be attained with higher precision. However, when an original having black characters written on a chromatic color background is input, since a plurality of pixel values are weighted and integrated, the features of L, Ca, and Cb components of black characters are canceled by those of the background chromatic color, and the black characters cannot be accurately determined as an achromatic color, resulting in determination errors. Consequently, black characters on the chromatic color background cannot be satisfactorily reproduced.

To solve this problem, the nine embodiment uses both the color determination results in units of pixels and the color determination result obtained by weighted integration to attain color determination with higher precision.

The ninth embodiment of the present invention will be described in detail below with reference to FIG. 34. Note that the same reference numerals in FIG. 34 denote the same parts as in FIG. 26, and a detailed description thereof will be omitted. Hence, the differences from FIG. 26 will be explained below.

Figure 35:
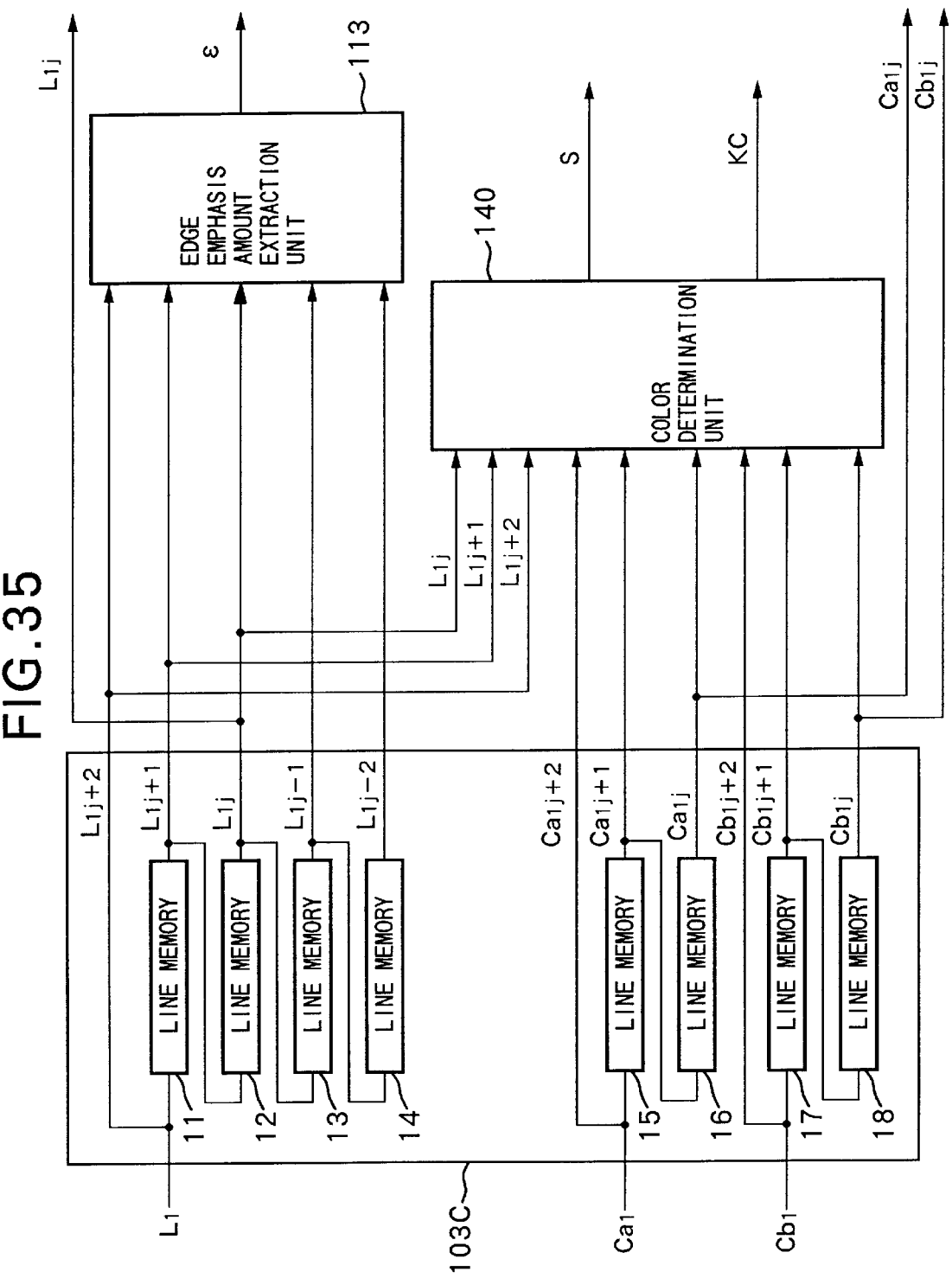
FIG. 35 is a block diagram showing the arrangement around a delay unit 103C in FIG. 34.

In the ninth embodiment, a color determination unit 140 shown in FIG. 35 is prepared by combining a saturation extraction unit and an achromatic color/chromatic color determination unit. The color determination unit 140 receives input values Ca1, Cb1, and L1 for three lines, and outputs a saturation signal S and an achromatic color/chromatic color determination signal KC for the pixel of interest.

A delay unit 103C of the present invention will be explained below with reference to FIG. 35. A lightness signal L1 and chromaticity signals Ca1 and Cb1 output from a first color space conversion unit 102 are input to the delay unit 103C, in which line memories 11 to 14 store lightness signals L1 for four lines, and line memories 15 and 16 store chromaticity signals Ca1 for two lines and line memories 17 and 18 store chromaticity signals Cb1 for two lines so as to be synchronized with the central pixel of the lightness signals.

Assuming that line j represents the central line, lightness signals for lines j−2, j−1, j, and j+1 are stored and, consequently, lightness signals for five lines including the current line j+2 are output.

On the other hand, as for the chromaticity signal Ca1, the line memories 15 and 16 of the delay unit 103 store signals for lines j and j+1, and chromaticity signals Ca1 for three lines including the current line j+2 are output. Similarly, as for the chromaticity signal Cb1, signals for lines j and j+1 are stored, and chromaticity signals Cb1 for three lines including the current line j+2 are output.

In the ninth embodiment, upon calculating the saturation signal S and achromatic color/chromatic color determination signal KC, data L1, Ca1, and Cb1 for three lines, i.e., lines j+2, j+1, and j, and spatial processing is done by setting the pixel of interest in line j+1.

Figure 36:
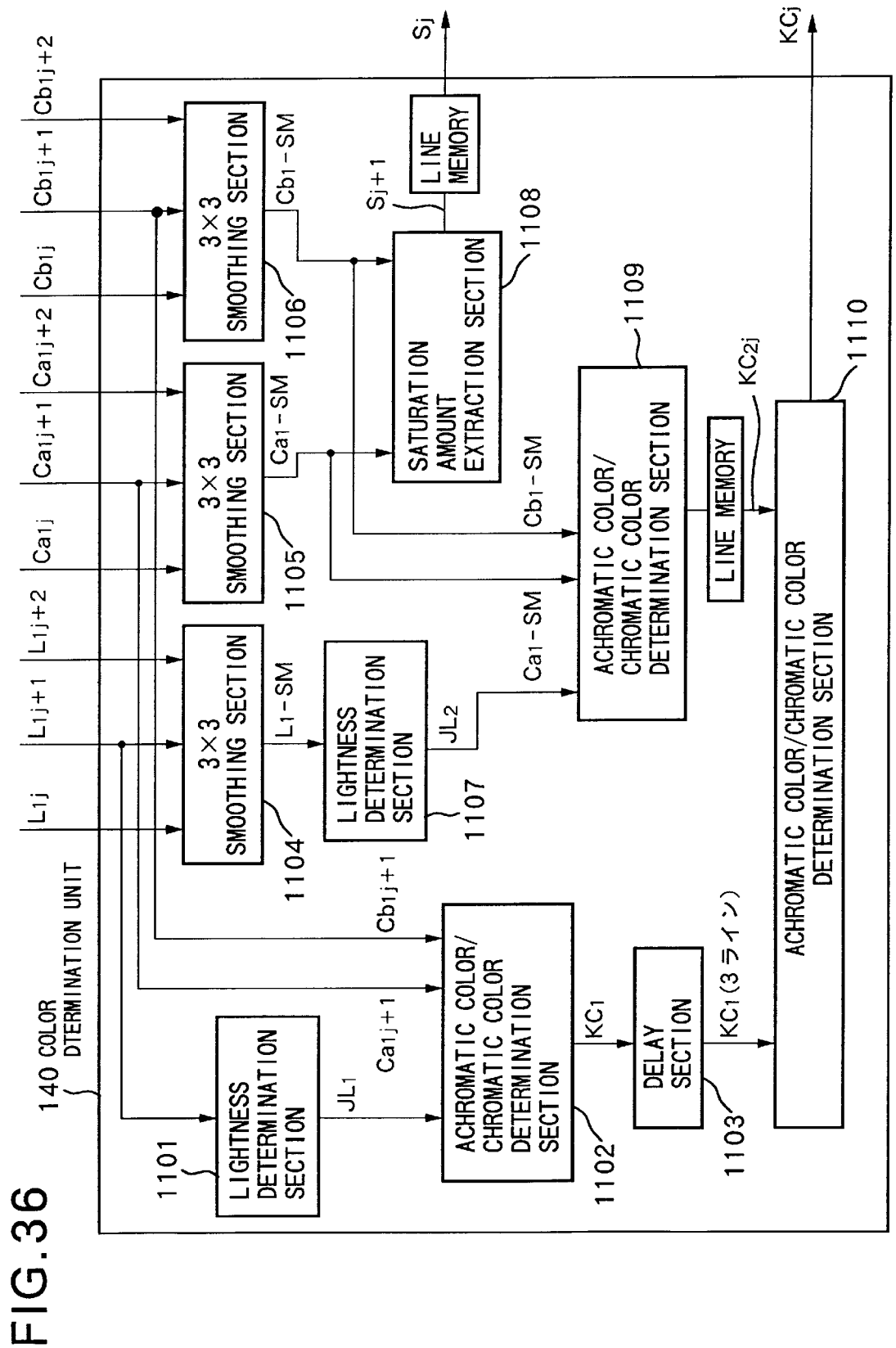
FIG. 36 is a block diagram showing the arrangement of a color determination unit 140 in FIG. 34.

FIG. 36 is a block diagram showing the arrangement of the color determination unit 140 in the ninth embodiment.

A lightness determination section 1101 in the color determination unit 140 performs the same determination as in the lightness determination section 61 in the eighth embodiment described above. That is, when the input lightness signal L for the pixel of interest falls within the middle range of the color space defined by L, Ca, and Cb, a signal JL1=0 is output; when the lightness signal is smaller than a given slice level or larger than another slice level, a signal JL=1 is output. Also, an achromatic color/chromatic color determination section 1102 performs the same determination as in the achromatic color/chromatic color determination unit 63 in the eighth embodiment. That is, the section 1102 determines an achromatic color/chromatic color for the pixel of interest in units of pixels, and outputs a determination signal KC1.

Figure 37:
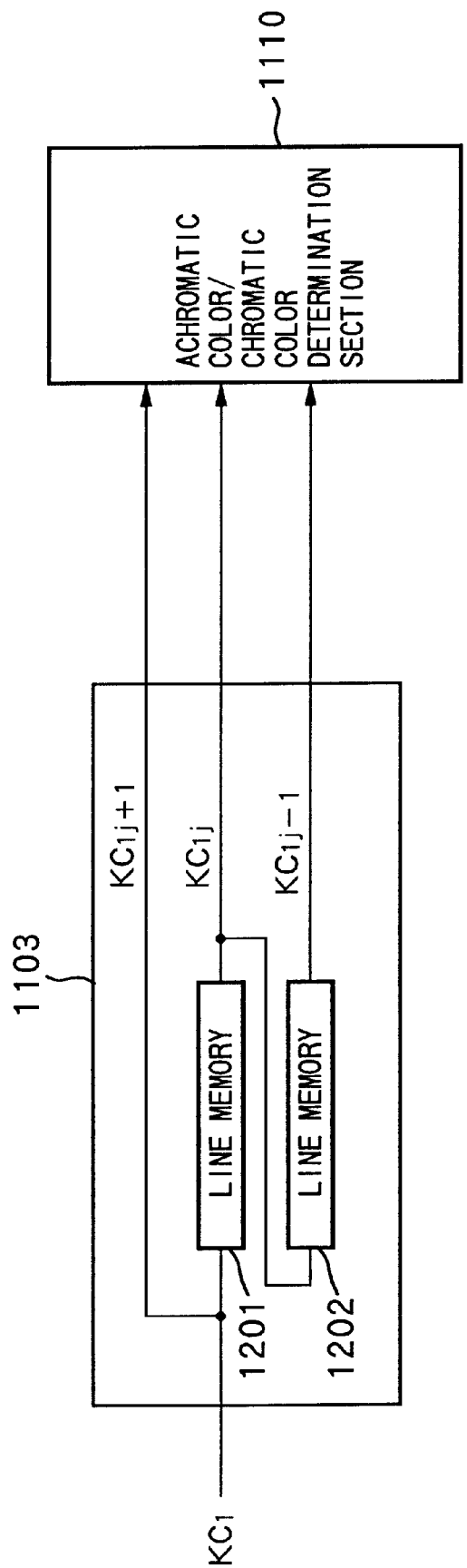
FIG. 37 is a block diagram showing the arrangement of a delay section 1103 in FIG. 36.

The determination result is delayed by a plurality of lines by a delay unit 1103 to supply 3×3 signals, i.e., a total of nine signals KC1 to an achromatic color/chromatic color determination section 1110. For this purpose, the delay section 1103 has an arrangement shown in FIG. 37.

3×3 smoothing sections 1104 to 1106 perform weighted integration using delay memories as in the seventh embodiment.

A saturation amount extraction section 1108 performs the same processing as in the seventh embodiment on the basis of weighted and integrated values Ca1_SM and Cb1_SM, and outputs a saturation signal S. Since the signal S calculated by this section is an output corresponding to line j+1, a signal obtained by delaying that signal by one line is output as a signal S.

Furthermore, a lightness determination section 1107 outputs a signal JL2 on the basis of a weighted and tintegrated lightness signal L1_SM as in the lightness determination section 1101.

Figure 38:
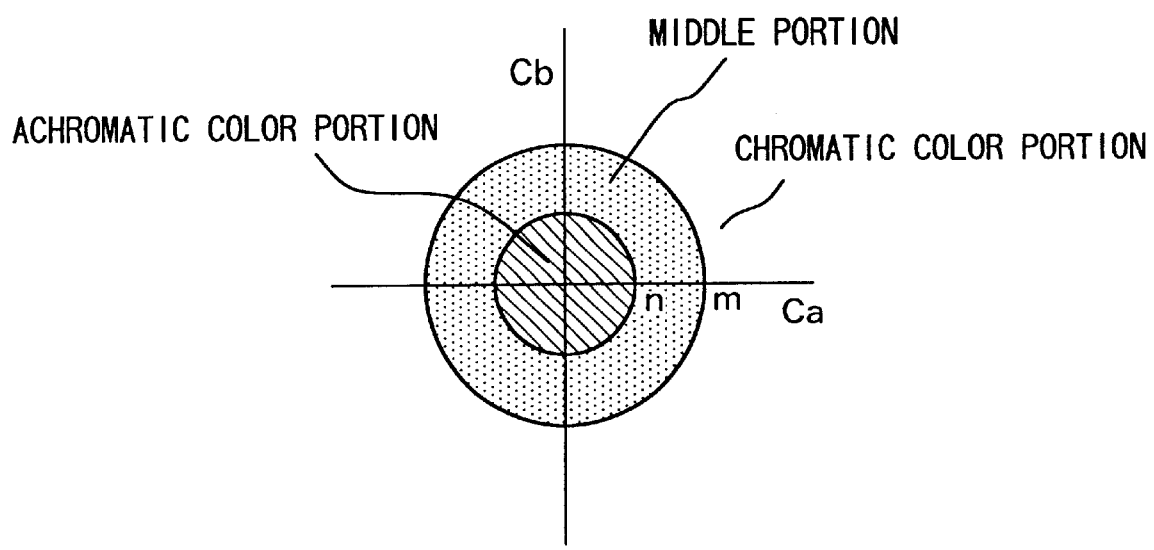
FIG. 38 shows the determination result distribution of an achromatic color/chromatic color determination section 1109 in FIG. 36.

An achromatic color/chromatic color determination section 1109 divides the color space of Ca and Cb into an area clearly indicating an achromatic color, an area clearly indicating a chromatic color, and a middle area, as shown in FIG. 38.

(When $S<n$) $KC2$=achromatic color area (When $n \leq S<m$) $KC2$=middle area (When $m<S$) $KC2$=chromatic color area     (15)

Note that the values of the slice levels m and n vary depending on the signal JL2 from the lightness determination section 1107. That is, When $JL2=0$, $n=n0$, $m=m0$ When $JL2=1$, $n=n1$, $m=m1$ for n0>n1, m0>m1

JL2=1 corresponds to a case wherein the weighted and integrated value L1_SM is equal to or lower than a given slice level (relatively darker) or is equal to or higher than another slice level (relatively lighter), and JL2=0 indicates the middle position.

In this manner, the achromatic color/chromatic color determination section 1110 synchronously receives 3×3 signals KC1 from the delay section 1103, and a signal KC2 corresponding to the position of the pixel of interest obtained by delaying a signal KC2 corresponding to line j+1 by one line output from the achromatic color/chromatic color determination section 1109.

The achromatic color/chromatic color determination section 1110 generates a signal KC indicating the final achromatic color/chromatic color determination result on the basis of these signals, and outputs the signal KC. The generation conditions are as follows:

When the determination result KC2 from the achromatic color/chromatic color determination section 1109 indicates an achromatic color→the output signal KC is set to indicate an achromatic color.

When the determination result KC2 from the achromatic color/chromatic color determination section 1109 indicates a chromatic color→the output signal KC is set to indicate a chromatic color.

When the determination result KC2 from the achromatic color/chromatic color determination section 1109 indicates a middle area (a chromatic color or an achromatic color cannot be determined)→in the 3×3 KC1 area of the determination results from the achromatic color/chromatic color determination section 1102, if more than half the nine pixels indicate an achromatic color, the output signal KC is set to indicate an achromatic color; if more than half the nine pixels indicate a chromatic color, the output signal KC is set to indicate a chromatic color.

Figure 39:
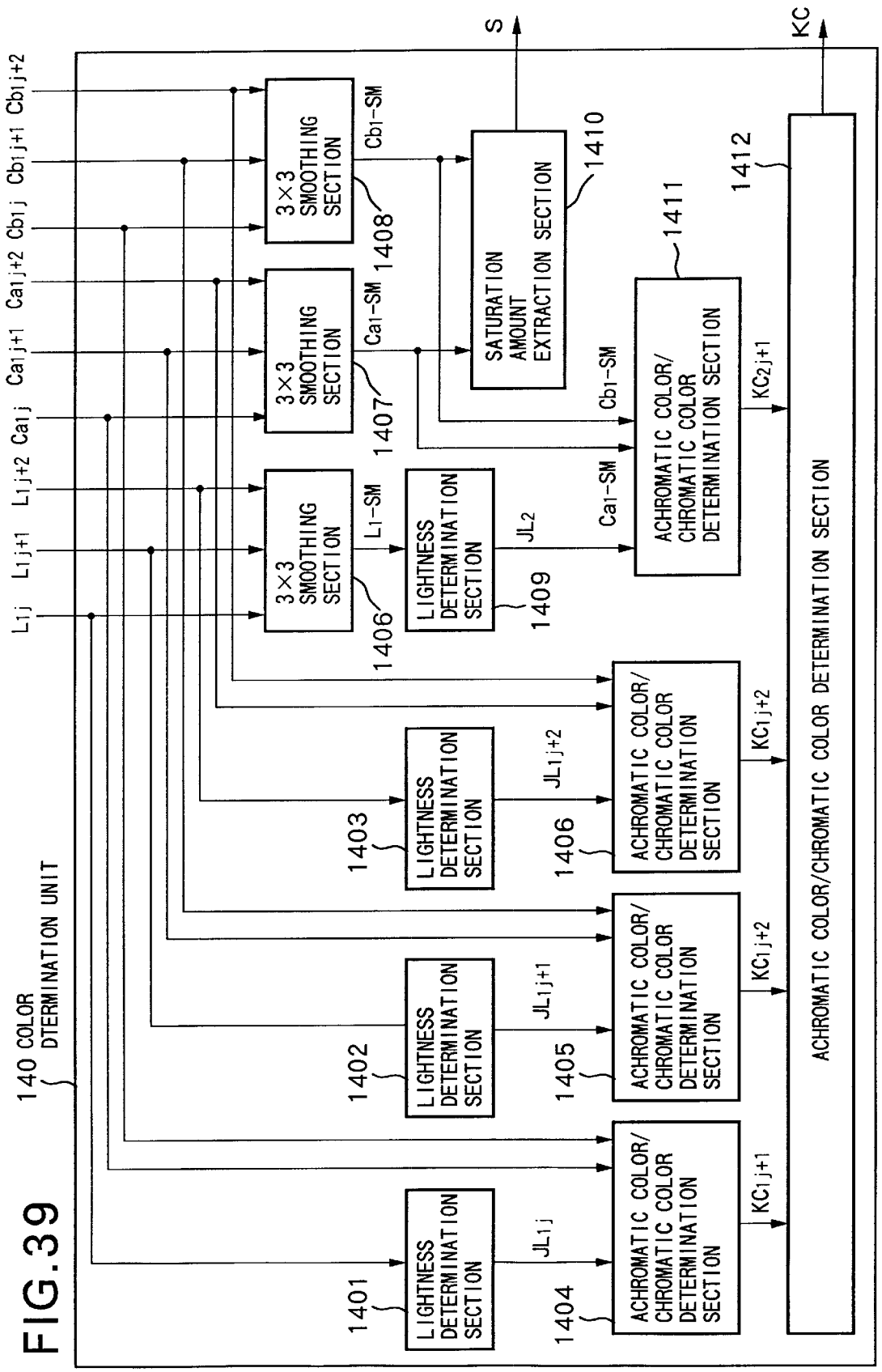
FIG. 39 is block diagram showing another arrangement of the color determination unit in the ninth embodiment.

As described above, in the ninth embodiment of the present invention, since determination results in units of pixels are area-processed, the delay section 1103, and line memories for synchronizing the signals KC1, KC2, and S are used. Alternatively, as shown in FIG. 39, when lightness determination and achromatic color/chromatic color determination are done using data L1, Ca1, and Cb1 for three lines, i.e., lines j+2, j+1, and j, no memories are required, and cost can be reduced.

As described above, according to the sixth to ninth embodiments, the influences of noise and color misregistration can be suppressed, and color determination can be attained more accurately. In addition, determination errors in a color misregistration portion around a black character and a portion where determination errors are likely to occur are eliminated, thereby realizing a high-quality color image.

As described above, according to the seventh to ninth embodiments, an achromatic color/chromatic color of each pixel in input color image data can be accurately determined.

Hence, the influences of noise included in the input color image and color misregistration caused by, e.g., an image scanner can be suppressed, and a high-quality image can be output upon printing.

Note that means for forming a color image is not particularly mentioned above. For example, a laser beam printer may be used, or other printers such as an inkjet printer may be used. If the laser beam printer is used, printing may be done based on finally obtained data C4, M4, Y4, and K4 using, e.g., a PWM scheme or the like. When these signals are to be binarized, a known binarization means (e.g., a dither method, error diffusion method, or the like) may be used, and binary data may be printed.

In the descriptions of the first to ninth embodiments, the present invention is mainly applied to the copying machine. Even though the initial input source of image data is an image scanner, since the present invention can be applied to a case wherein image data is input via a storage medium or a network, the present invention is not limited by the above embodiments. Also, the output unit need not always directly output an image to a printer, but may output an image to a storage medium or may transmit an image to another end terminal (e.g., a facsimile apparatus) via a network.

Hence, the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus having a function of discriminating whether an input image is a color image or not, comprising:

determination means for determining whether a pixel of interest is a chromatic color pixel; and discrimination means for discriminating in accordance with continuity of determination results of said determination means in two-dimensional directions whether the input image is a color image, wherein said discrimination means includes first decision means for deciding if chromatic color pixels continue in a main scanning direction, wherein said discrimination means further includes second decision means for deciding if the number of portions including continuous chromatic color pixels in the main scanning direction is not less than a predetermined value, and wherein said discrimination means further includes third decision means for deciding if not less than a predetermined number of chromatic color lines continue in a sub-scanning direction.

2. An image processing method having a function of discriminating whether an input image is a color image or not, comprising:

a determination step of determining whether a pixel of interest is a chromatic color pixel; and a discrimination step of discriminating in accordance with continuity of determination results in the determination step in two-dimensional directions if the input image is a color image, wherein the discrimination step includes the first decision step of deciding if chromatic color pixels continue in a main scanning direction, wherein the discrimination step further includes a second decision step of deciding if the number of portions including continuous chromatic color pixels in the main scanning direction is not less than a predetermined value, and wherein the discrimination step further includes a third decision step of deciding if not less than a predetermined number of chromatic color lines continue in a sub-scanning direction.

* * * * *

UNITED STATES PATENT AND TRADEMARK OFFICE
CERTIFICATE OF CORRECTION

PATENT NO.    : 6,449,060 B1                                                    Page 1 of 1
DATED         : September 10, 2002
INVENTOR(S)   : Takashi Kawai et al.

It is certified that error appears in the above-identified patent and that said Letters Patent is hereby corrected as shown below:

Drawings,
Sheet 1 of 35, Fig. 1, "HARFTONE" should read -- HALFTONE --.
Sheet 2 of 35, Fig. 2, "HARFTONE" should read -- HALFTONE --.
Sheet 4 of 35, Fig. 4, "DETERMINTATION" should read -- DETERMINATION --.
Sheet 5 of 35, Fig. 6, "DETERMINTATION" should read -- DETERMINATION --.
Sheet 7 of 35, Fig. 9, "HARFTONE" should read -- HALFTONE --.
Sheet 9 of 35, Fig. 11, "HARFTONE" should read -- HALFTONE --.
Sheet 10 of 35, Fig. 12, "HARFTONE" should read -- HALFTONE --.
Sheet 11 of 35, Fig. 13, "HARFTONE" should read -- HALFTONE --.
Sheet 14 of 35, Fig. 16, "HARFTONE" should read -- HALFTONE --.
Sheet 22 of 35, Fig. 26, "HARFTONE" should read -- HALFTONE --.
Sheet 26 of 35, Fig. 30, "HARFTONE" should read -- HALFTONE --.
Sheet 30 of 35, Fig. 34, "HARFTONE" should read -- HALFTONE --.

Signed and Sealed this

Eleventh Day of March, 2003

JAMES E. ROGAN
*Director of the United States Patent and Trademark Office*